(12) United States Patent
Fujisaki

(10) Patent No.: US 10,073,254 B2
(45) Date of Patent: Sep. 11, 2018

(54) ZOOM LENS AND IMAGE PICKUP APPARATUS INCLUDING THE SAME

(71) Applicant: CANON KABUSHIKI KAISHA, Tokyo (JP)

(72) Inventor: Toyokatsu Fujisaki, Utsunomiya (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 14 days.

(21) Appl. No.: 15/251,413

(22) Filed: Aug. 30, 2016

(65) Prior Publication Data

US 2017/0059834 A1 Mar. 2, 2017

(30) Foreign Application Priority Data

Sep. 2, 2015 (JP) .................. 2015-172770

(51) Int. Cl.
| | | |
|---|---|---|
| *G02B 15/14* | (2006.01) | |
| *G02B 9/60* | (2006.01) | |
| *G02B 13/18* | (2006.01) | |
| *G02B 15/22* | (2006.01) | |
| *G02B 15/173* | (2006.01) | |
| *G02B 15/20* | (2006.01) | |
| *G02B 13/00* | (2006.01) | |
| *G02B 27/00* | (2006.01) | |

(Continued)

(52) U.S. Cl.
CPC .......... *G02B 15/22* (2013.01); *G02B 15/173* (2013.01); *G02B 15/20* (2013.01); *G02B 5/005* (2013.01); *G02B 9/60* (2013.01); *G02B 13/009* (2013.01); *G02B 13/0015* (2013.01); *G02B 13/0045* (2013.01); *G02B 13/18* (2013.01); *G02B 15/16* (2013.01); *G02B 27/0025* (2013.01)

(58) Field of Classification Search
CPC .. G02B 13/0045; G02B 27/0025; G02B 9/60; G02B 13/18; G02B 15/20; G02B 13/009; G02B 15/16; G02B 5/005; G02B 13/0015; G02B 15/173
USPC ....... 359/676, 683–685, 686, 687, 713, 714, 359/740, 755, 756, 763, 764
See application file for complete search history.

(56) References Cited

U.S. PATENT DOCUMENTS

| | | |
|---|---|---|
| 9,046,676 B2 | 6/2015 | Sugita |
| 9,158,098 B2 | 10/2015 | Takahashi et al. |

(Continued)

FOREIGN PATENT DOCUMENTS

| | | |
|---|---|---|
| JP | 2013080153 A | 5/2013 |
| JP | 2013235060 A | 11/2013 |
| JP | 2014021367 A | 2/2014 |

*Primary Examiner* — Evelyn A Lester
(74) *Attorney, Agent, or Firm* — Rossi, Kimms & McDowell LLP

(57) ABSTRACT

A zoom lens includes, in order from an object side to an image side, a first lens unit having a positive refractive power, a second lens unit having a negative refractive power, a third lens unit having a positive refractive power, and a rear lens group including one or more lens units. For zooming, the first to third lens units move, thereby changing intervals between adjacent ones of these lens units. For the zoom lens, a focal length (f1) of the first lens unit, focal lengths (fw, ft) of the zoom lens at a wide angle end and at a telephoto end, respectively, and amounts (M2, M3) by which the second and third lens units, respectively, move when zooming from the wide angle end to the telephoto end are appropriately defined.

18 Claims, 11 Drawing Sheets

(51) Int. Cl.
*G02B 5/00* (2006.01)
*G02B 15/16* (2006.01)

(56) References Cited

U.S. PATENT DOCUMENTS

| | | | | |
|---|---|---|---|---|
| 2010/0134901 A1* | 6/2010 | Kimura | ............... | G02B 15/173 359/687 |
| 2013/0100335 A1* | 4/2013 | Nanba | ................. | G02B 15/173 359/683 |
| 2013/0208364 A1* | 8/2013 | Ito | ...................... | G02B 15/173 359/690 |
| 2013/0242169 A1* | 9/2013 | Okubo | ................ | G02B 15/173 359/683 |
| 2013/0321681 A1* | 12/2013 | Sakai | .................... | G02B 15/14 359/690 |
| 2014/0043692 A1* | 2/2014 | Mogi | .................... | G02B 15/14 359/683 |
| 2015/0062385 A1* | 3/2015 | Fujisaki | ............. | G02B 15/173 359/683 |

* cited by examiner

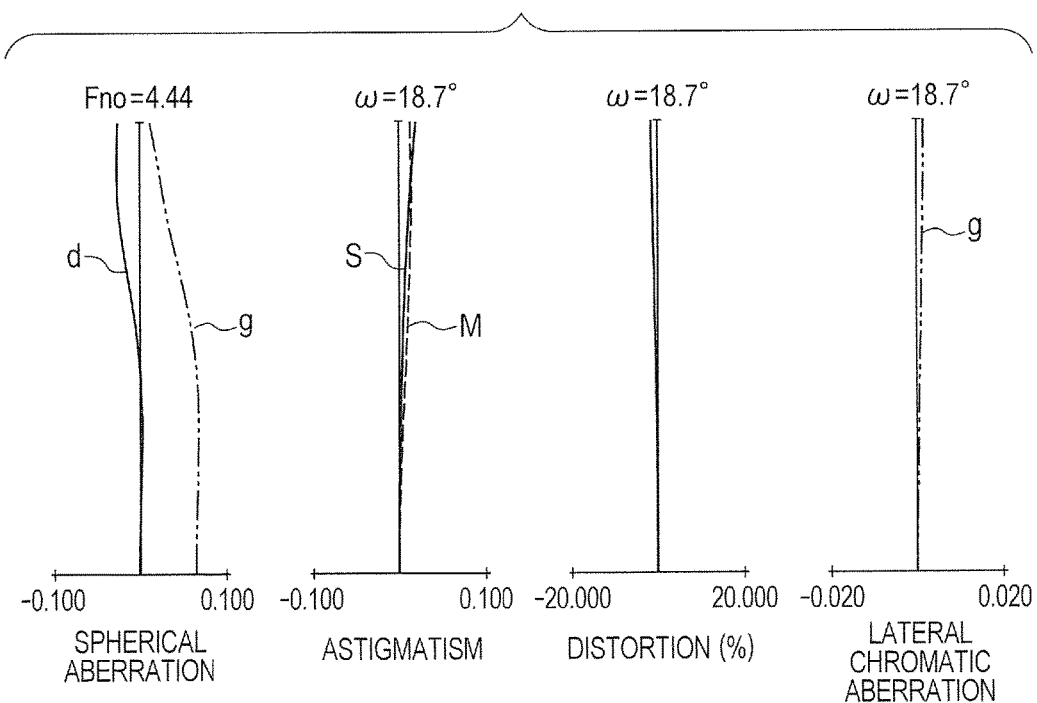
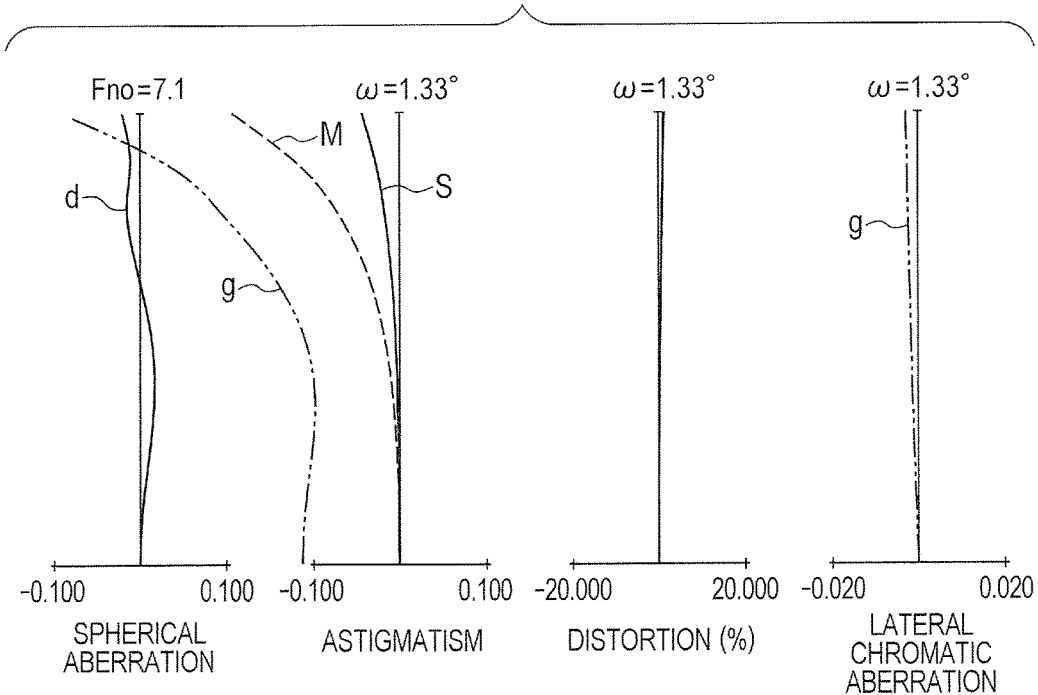

ZOOM LENS AND IMAGE PICKUP APPARATUS INCLUDING THE SAME

BACKGROUND OF THE INVENTION

Field of the Invention

The present invention relates to a zoom lens advantageously applicable to an image pickup optical system for use in an image pickup apparatus, such as a digital still camera, a video camera, a monitoring camera, a broadcasting camera, or a silver-halide film camera.

Description of the Related Art

Recent image pickup apparatuses are highly functional and compact as a whole. A zoom lens for use as an image pickup optical system in such image pickup apparatuses is desired to be compact, have a high zoom ratio, offer a wide angle of view, and deliver high optical performance over the entire zoom range. The zoom lens is also desired to be short in the optical axis direction.

The following positive lead type zoom lens is known as a zoom lens that provides both compactness and a high zoom ratio. This zoom lens includes, in order from an object side to an image side, a first lens unit having a positive refractive power, a second lens unit having a negative refractive power, a third lens unit having a positive refractive power, and a rear lens group including one or more lens units.

Japanese Patent Application Laid-Open No. 2014-21367 discloses a positive lead type zoom lens with a rear lens group including a fourth lens unit having a negative refractive power and a fifth lens unit having a positive refractive power. Japanese Patent Application Laid-Open No. 2013-235060 discloses a zoom lens with a rear lens group including a fourth lens unit having a positive refractive power and a fifth lens unit having a positive refractive power. Japanese Patent Application Laid-Open No. 2013-80153 discloses a zoom lens with a rear lens group including a fourth lens unit having a negative refractive power, a fifth lens unit having a positive refractive power, and a sixth lens unit having a positive refractive power.

Aiming for a high zoom ratio in a positive lead type zoom lens tends to cause various aberrations, such as spherical aberration, coma, and chromatic aberration, in a telephoto zoom range.

In addition, excessive reduction in the positive refractive power of the first lens unit increases the amount by which the first lens unit moves when zooming, and consequently increases the overall size of the zoom lens.

Thus, an appropriate setting of the refractive power of the first lens unit is important in a positive lead type zoom lens in order to achieve both compactness and a high zoom ratio while favorably correcting the various aberrations. It is also important to appropriately set the amounts by which the second lens unit and the third lens unit move when zooming.

When these lens units are not appropriately configured, it is difficult to obtain a zoom lens which is compact and has a high zoom ratio while favorably correcting the various aberrations.

SUMMARY OF THE INVENTION

A zoom lens of the present invention includes, in order from an object side to an image side: a first lens unit having a positive refractive power, a second lens unit having a negative refractive power, a third lens unit having a positive refractive power, and a rear lens group including one or more lens units, wherein during zooming, the first lens unit, the second lens unit, and the third lens unit move, thereby changing intervals between adjacent ones of these lens units, and the following conditions are satisfied:

$$0.01 < f1/ft < 0.30$$

$$9.0 < f1/fw < 20.0$$

$$-0.40 < M2/M3 < 0.20$$

where f1 is a focal length of the first lens unit, fw is a focal length of the zoom lens at a wide angle end, ft is a focal length of the zoom lens at a telephoto end, M2 is an amount by which the second lens unit moves when zooming from the wide angle end to the telephoto end, and M3 is an amount by which the third lens unit moves when zooming from the wide angle end to the telephoto end.

Further features of the present invention will become apparent from the following description of exemplary embodiments with reference to the attached drawings.

BRIEF DESCRIPTION OF THE DRAWINGS

FIG. 2B is a diagram showing aberrations in the zoom lens according to Embodiment 1 of the present invention at a middle zoom position.

FIG. 2C is a diagram showing aberrations in the zoom lens according to Embodiment 1 of the present invention at a telephoto end.

DESCRIPTION OF THE EMBODIMENTS

Preferred embodiments of the present invention will now be described in detail in accordance with the accompanying drawings.

Hereinbelow, descriptions are given of zoom lenses of the present invention and an image pickup apparatus having any of the zoom lenses. Each zoom lens of the present invention includes, in order from an object side to an image side, a first lens unit having a positive refractive power, a second lens unit having a negative refractive power, a third lens unit having a positive refractive power, and a rear lens group including one or more lens units. For zooming, the first lens unit, the second lens unit, and the third lens unit move, thereby changing the intervals between adjacent ones of the lens units.

Figure 1:
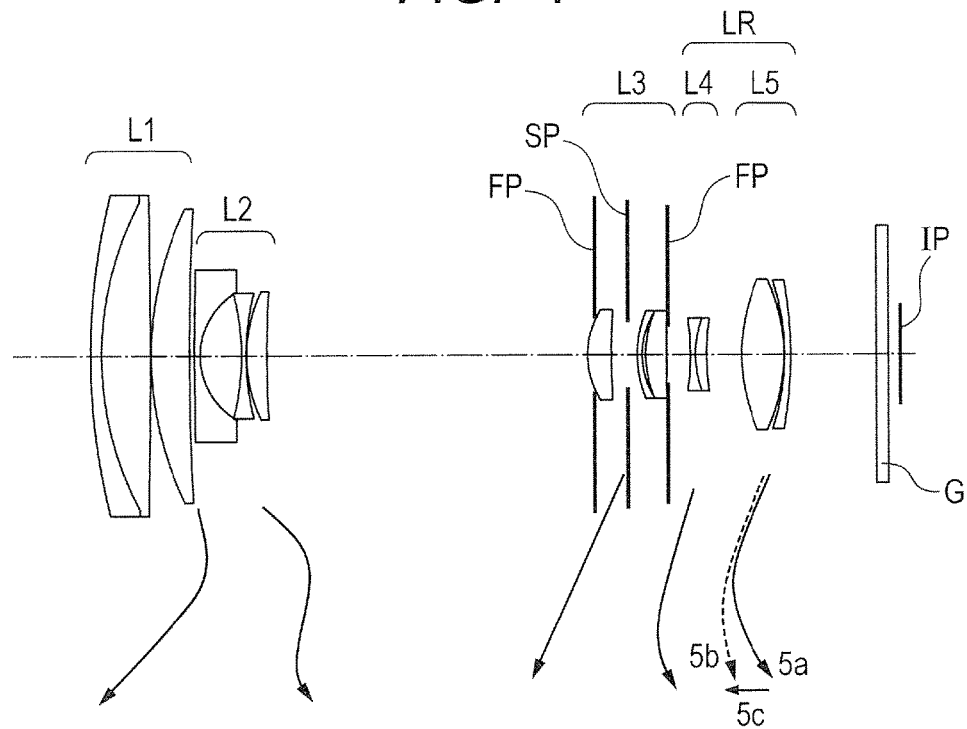
FIG. 1 is a sectional view of a zoom lens according to Embodiment 1 of the present invention at a wide angle end.
Figure 2A:
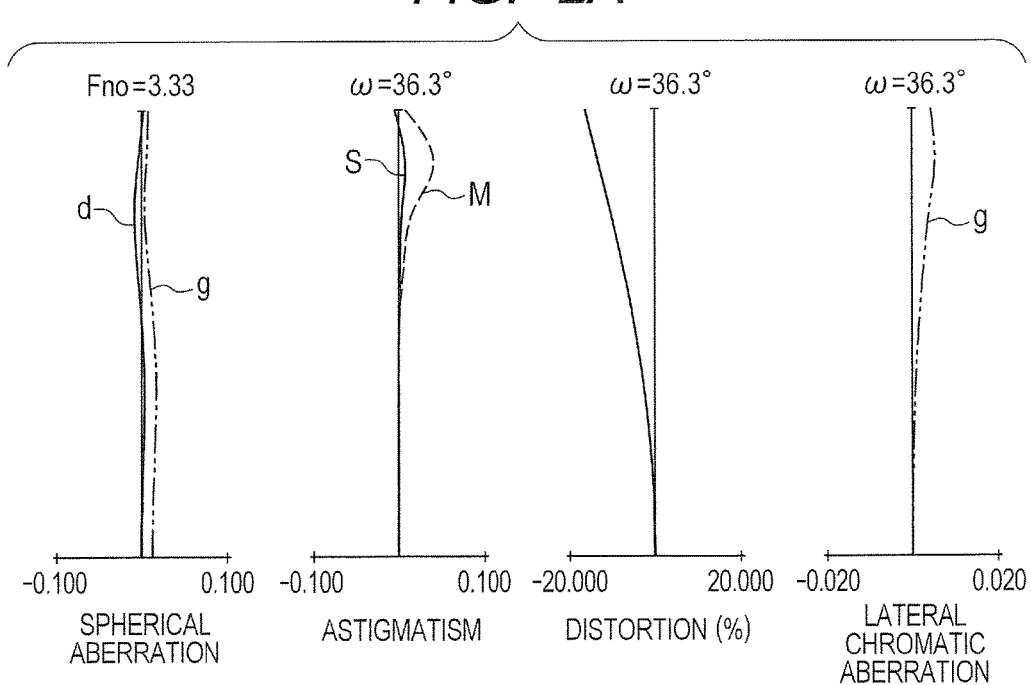
FIG. 2A is a diagram showing aberrations in the zoom lens according to Embodiment 1 of the present invention at the wide angle end.

FIG. 1 is a sectional view of a zoom lens according to Embodiment 1 of the present invention at a wide angle end (short focal length end). FIGS. 2A, 2B, and 2C are diagrams showing aberrations in the zoom lens of Embodiment 1 at the wide angle end, a middle zoom position, and a telephoto end (long focal length end), respectively. The zoom lens of Embodiment 1 has a zoom ratio of 37.76 and an F-number of 3.33 to 7.10.

Figure 3:
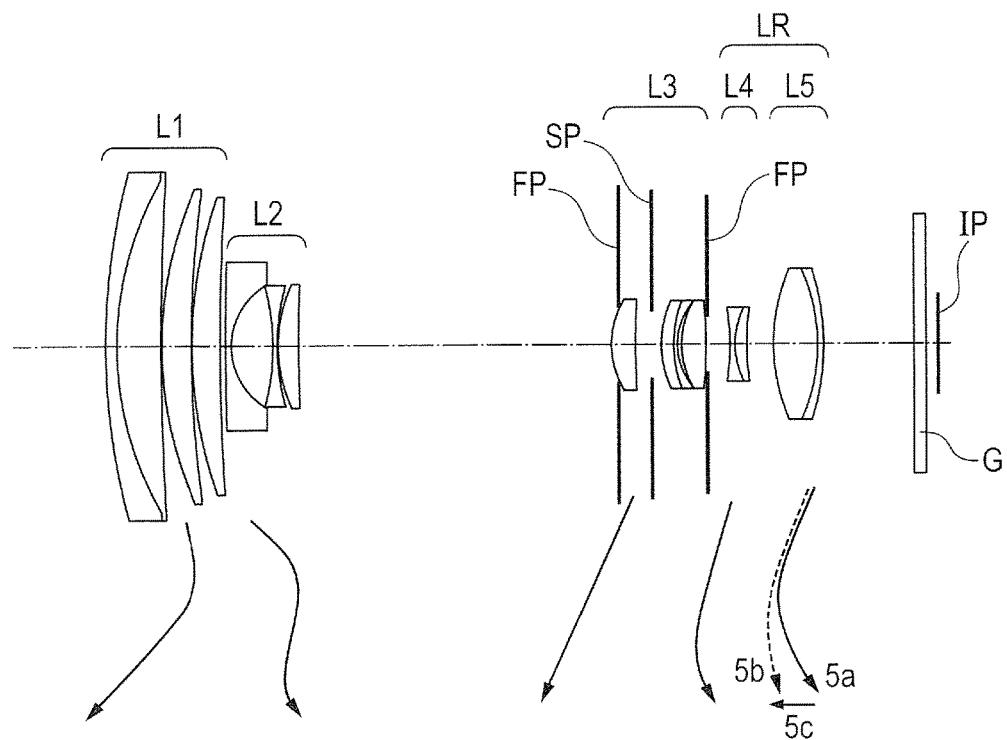
FIG. 3 is a sectional view of a zoom lens according to Embodiment 2 of the present invention at the wide angle end.
Figure 4A:
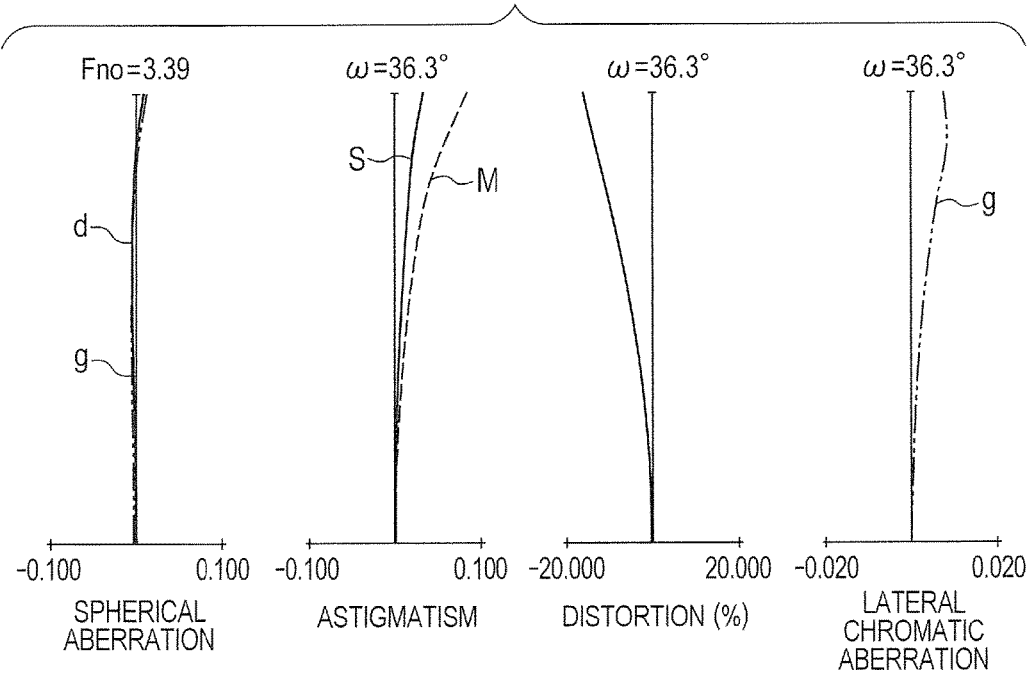
FIG. 4A is a diagram showing aberrations in the zoom lens according to Embodiment 2 of the present invention at the wide angle end.
Figure 4B:
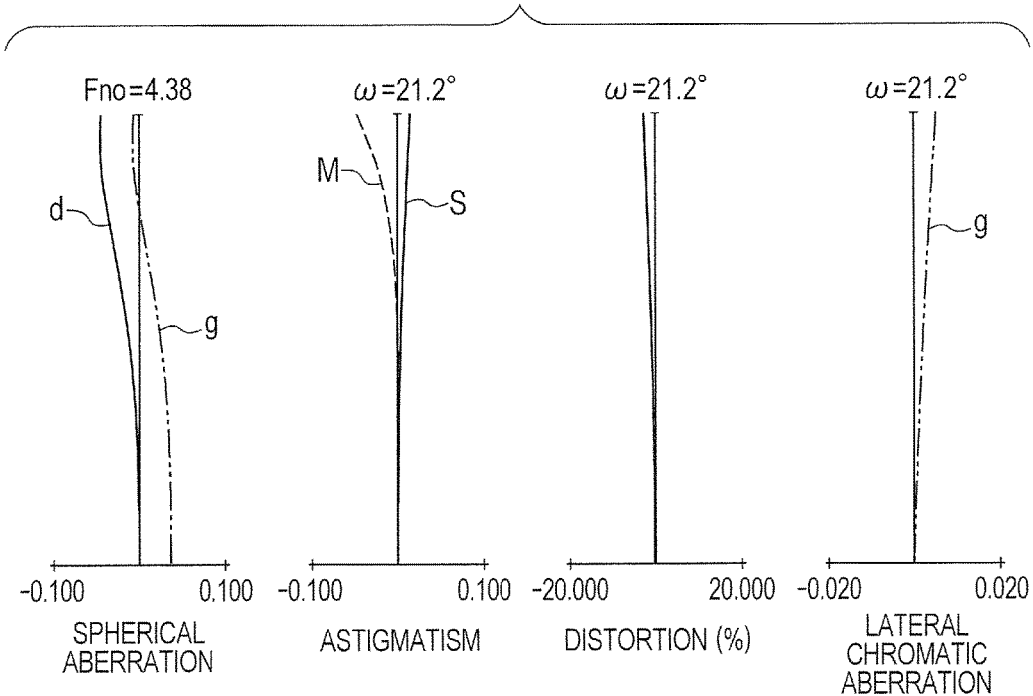
FIG. 4B is a diagram showing aberrations in the zoom lens according to Embodiment 2 of the present invention at the middle zoom position.
Figure 4C:
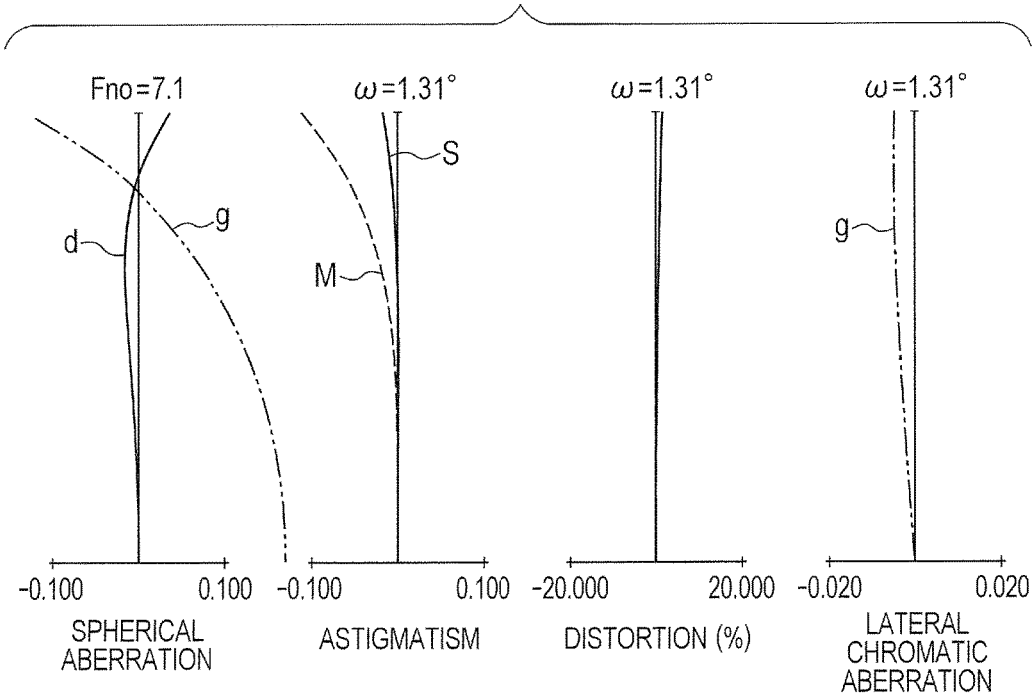
FIG. 4C is a diagram showing aberrations in the zoom lens according to Embodiment 2 of the present invention at the telephoto end.

FIG. 3 is a sectional view of a zoom lens according to Embodiment 2 of the present invention at the wide angle end. FIGS. 4A, 4B, and 4C are diagrams showing aberrations in the zoom lens of Embodiment 2 at the wide angle end, the middle zoom position, and the telephoto end, respectively. The zoom lens of Embodiment 2 has a zoom ratio of 38.37 and an F-number of 3.39 to 7.10.

Figure 5:
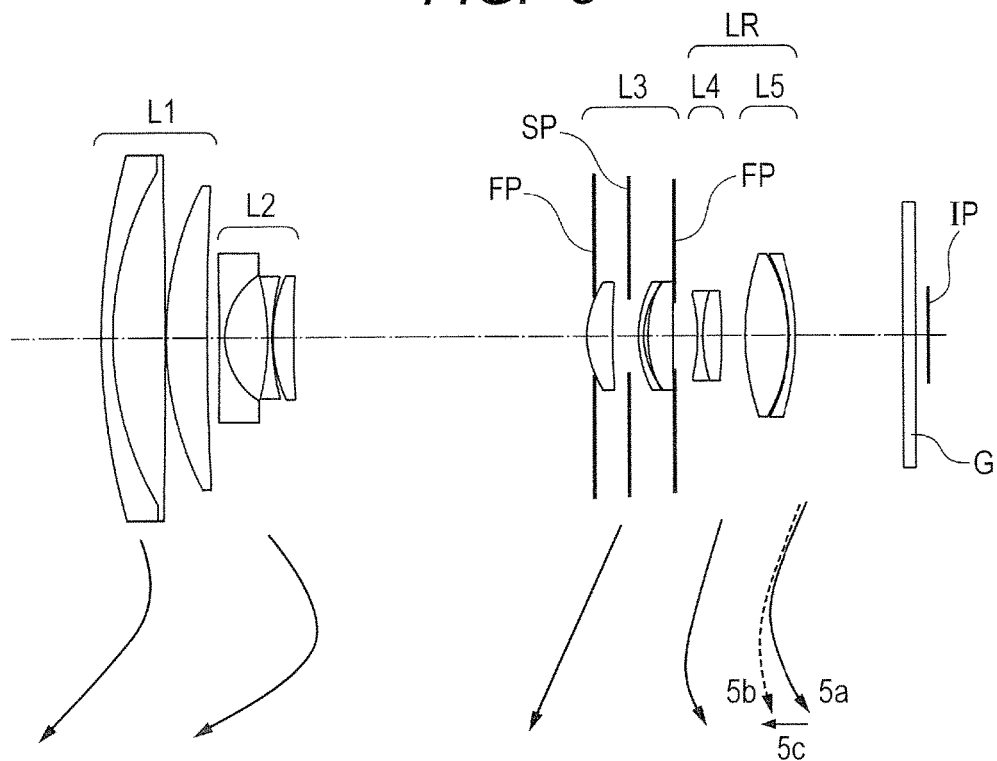
FIG. 5 is a sectional view of a zoom lens according to Embodiment 3 of the present invention at the wide angle end.
Figure 6A:
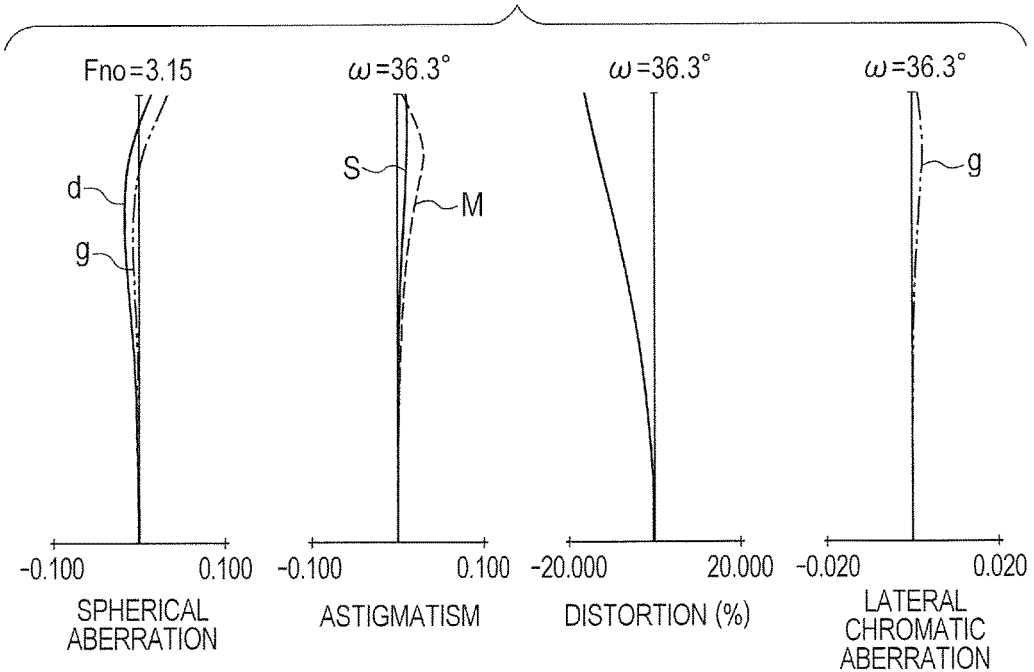
FIG. 6A is a diagram showing aberrations in the zoom lens according to Embodiment 3 of the present invention at the wide angle end.
Figure 6B:
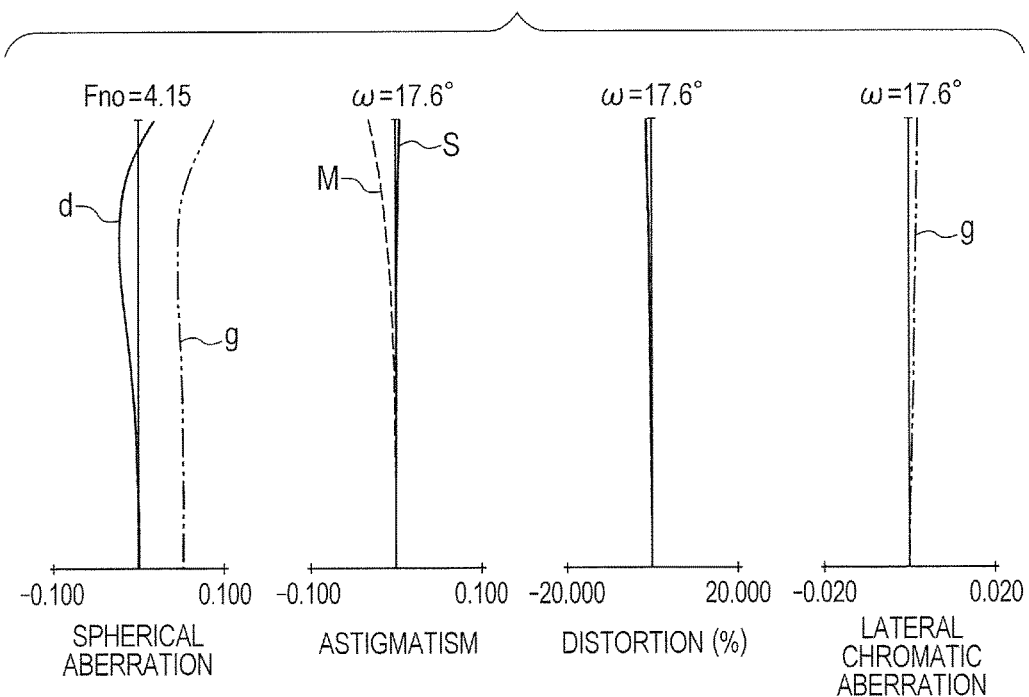
FIG. 6B is a diagram showing aberrations in the zoom lens according to Embodiment 3 of the present invention at the middle zoom position.
Figure 6C:
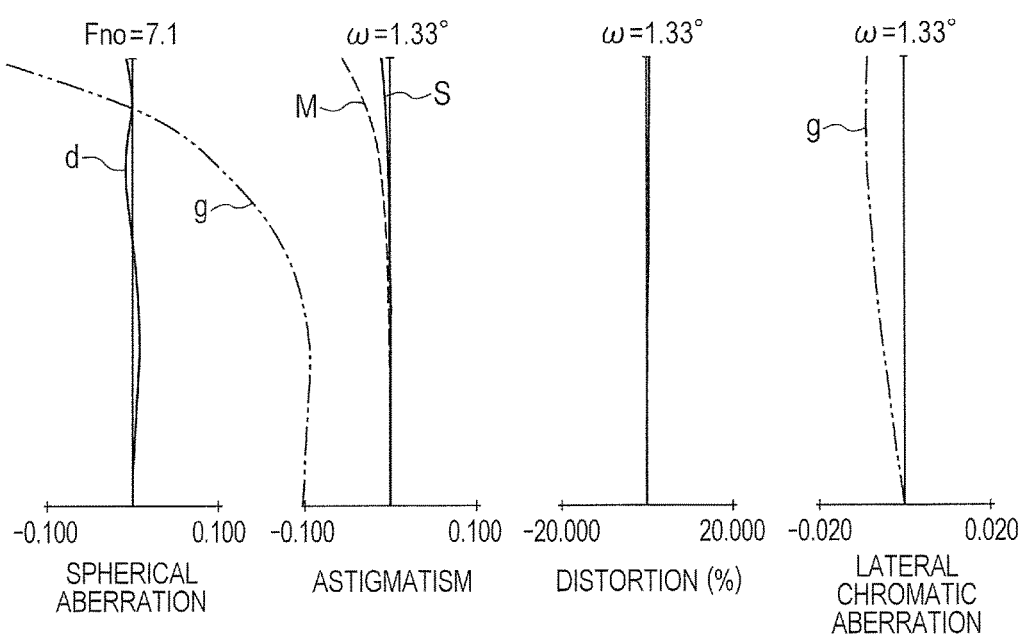
FIG. 6C is a diagram showing aberrations in the zoom lens according to Embodiment 3 of the present invention at the telephoto end.

FIG. 5 is a sectional view of a zoom lens according to Embodiment 3 of the present invention at the wide angle end. FIGS. 6A, 6B, and 6C are diagrams showing aberrations in the zoom lens of Embodiment 3 at the wide angle end, the middle zoom position, and the telephoto end, respectively. The zoom lens of Embodiment 3 has a zoom ratio of 37.75 and an F-number of 3.15 to 7.10.

Figure 7:
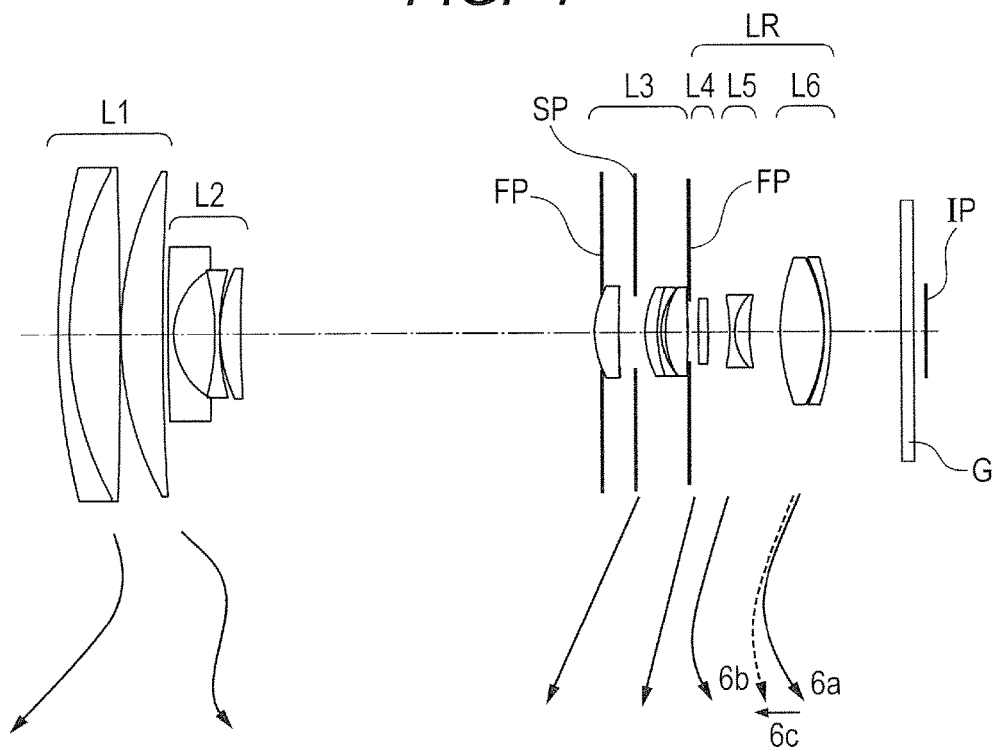
FIG. 7 is a sectional view of a zoom lens according to Embodiment 4 of the present invention at the wide angle end.
Figure 8A:
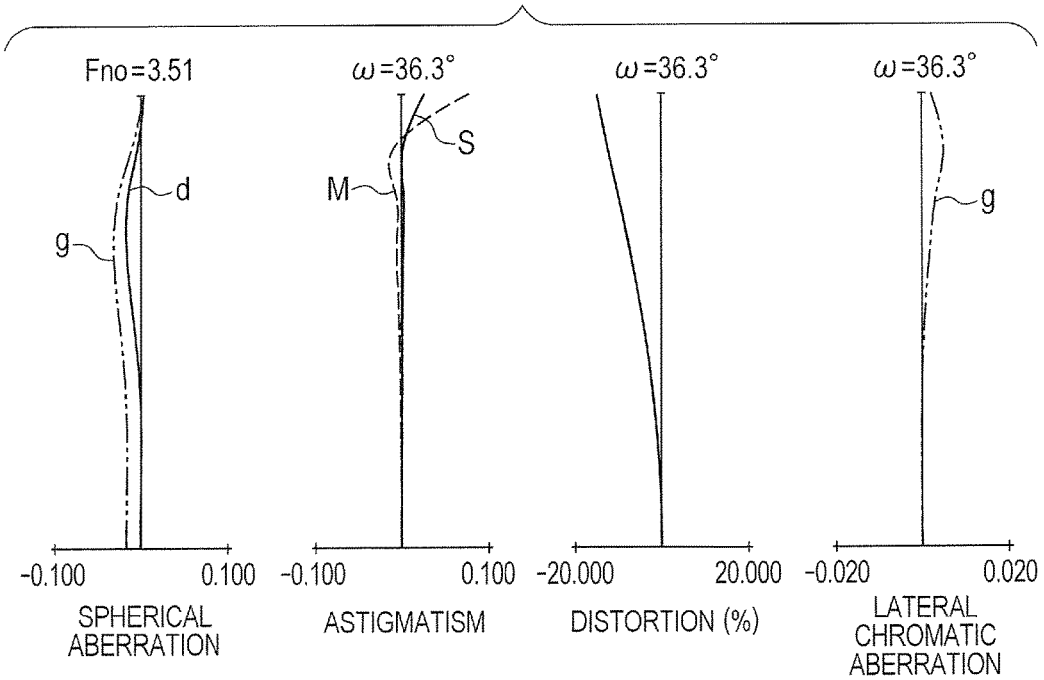
FIG. 8A is a diagram showing aberrations in the zoom lens according to Embodiment 4 of the present invention at the wide angle end.
Figure 8B:
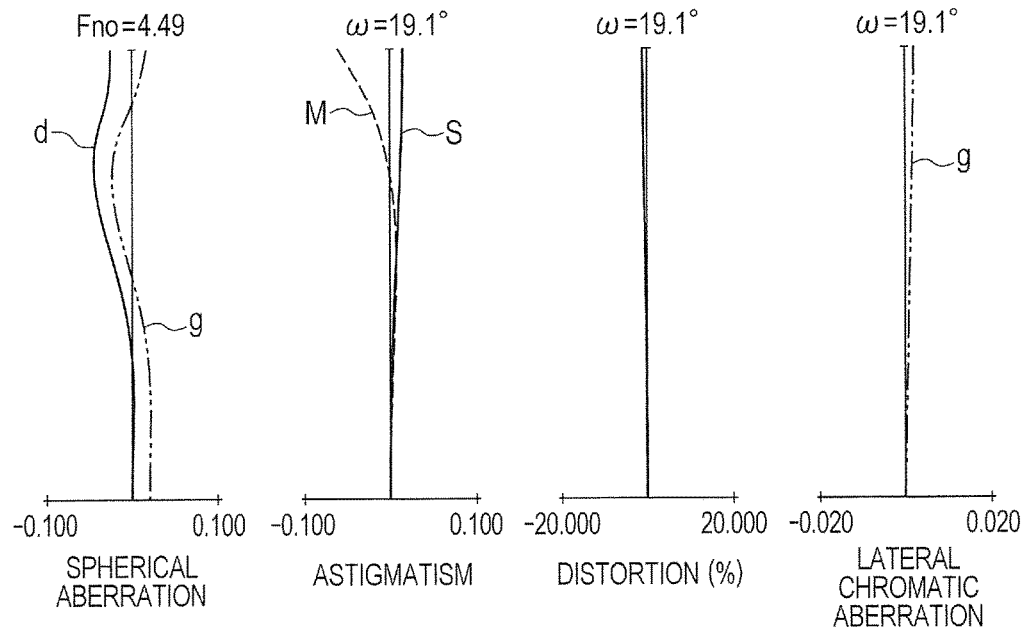
FIG. 8B is a diagram showing aberrations in the zoom lens according to Embodiment 4 of the present invention at the middle zoom position.
Figure 8C:
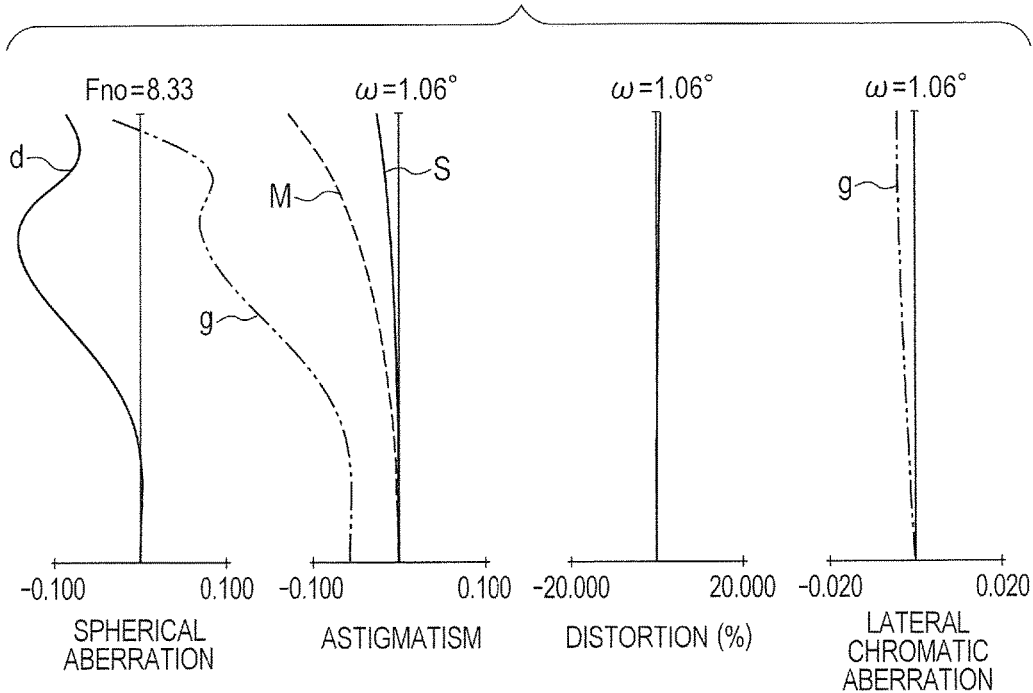
FIG. 8C is a diagram showing aberrations in the zoom lens according to Embodiment 4 of the present invention at the telephoto end.

FIG. 7 is a sectional view of a zoom lens according to Embodiment 4 of the present invention at the wide angle end. FIGS. 8A, 8B, and 8C are diagrams showing aberrations in the zoom lens of Embodiment 4 at the wide angle end, the middle zoom position, and the telephoto end, respectively. The zoom lens of Embodiment 4 has a zoom ratio of 47.35 and an F-number of 3.51 to 8.33.

Figure 9:
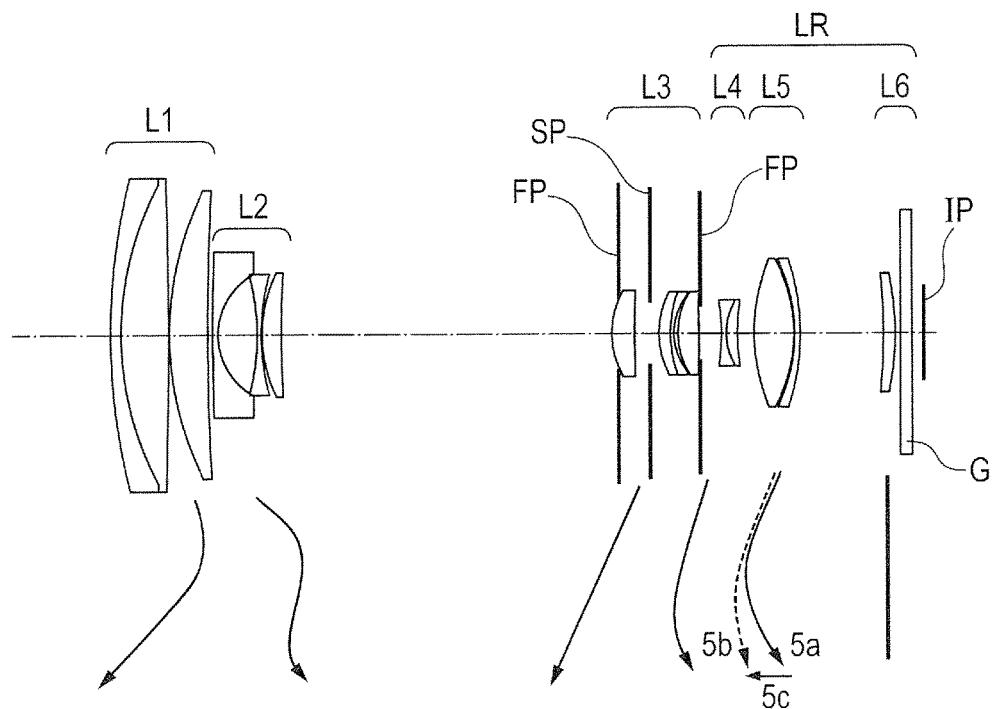
FIG. 9 is a sectional view of a zoom lens according to Embodiment 5 of the present invention at the wide angle end.
Figure 10A:
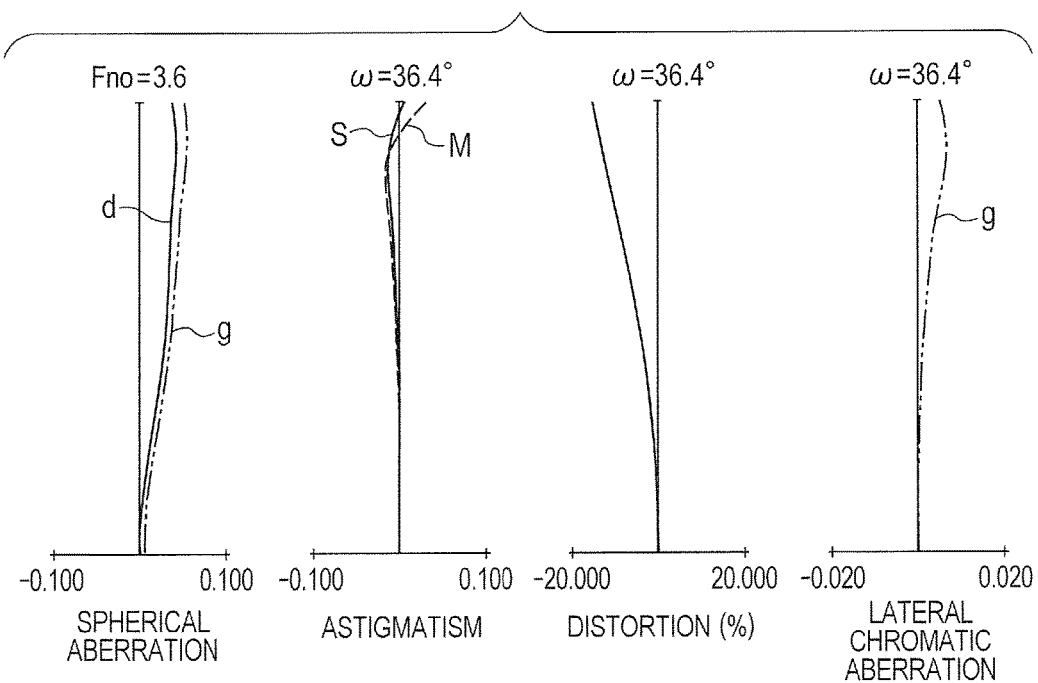
FIG. 10A is a diagram showing aberrations in the zoom lens according to Embodiment 5 of the present invention at the wide angle end.
Figure 10B:
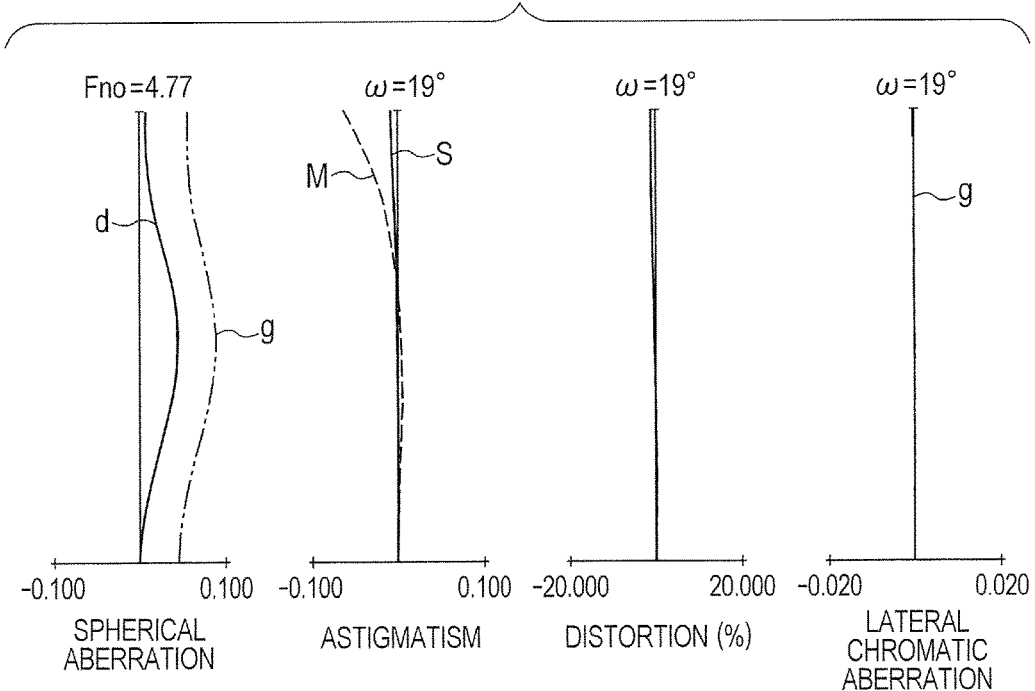
FIG. 10B is a diagram showing aberrations in the zoom lens according to Embodiment 5 of the present invention at the middle zoom position.
Figure 10C:
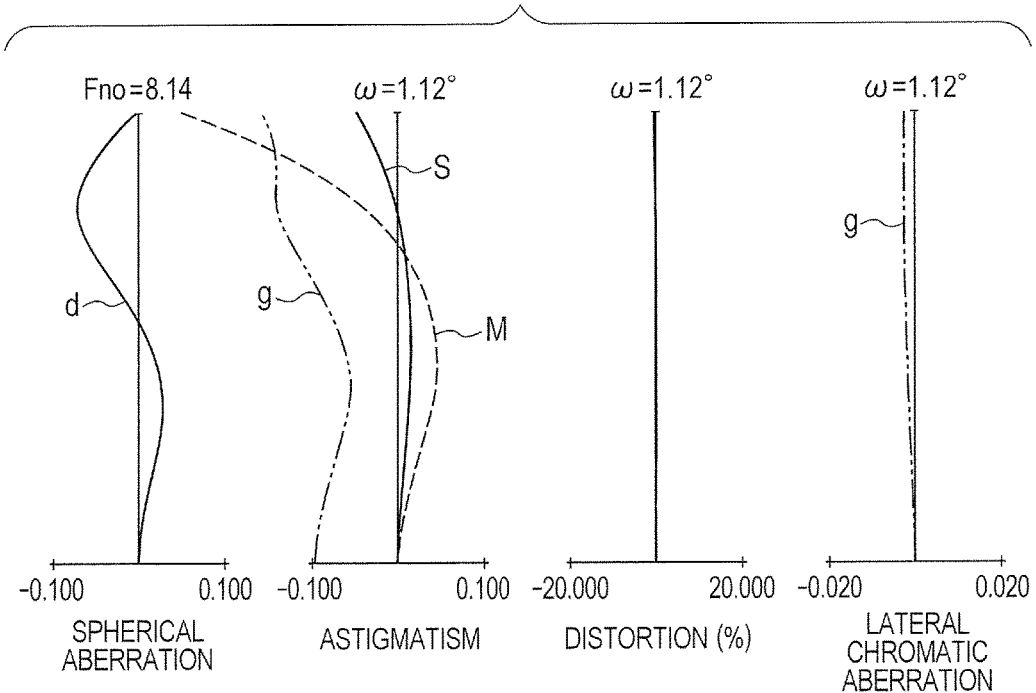
FIG. 10C is a diagram showing aberrations in the zoom lens according to Embodiment 5 of the present invention at the telephoto end.

FIG. 9 is a sectional view of a zoom lens according to Embodiment 5 of the present invention at the wide angle end. FIGS. 10A, 10B, and 10C are diagrams showing aberrations in the zoom lens of Embodiment 5 at the wide angle end, the middle zoom position, and the telephoto end, respectively. The zoom lens of Embodiment 5 has a zoom ratio of 45.12 and an F-number of 3.60 to 8.14.

Figure 11:
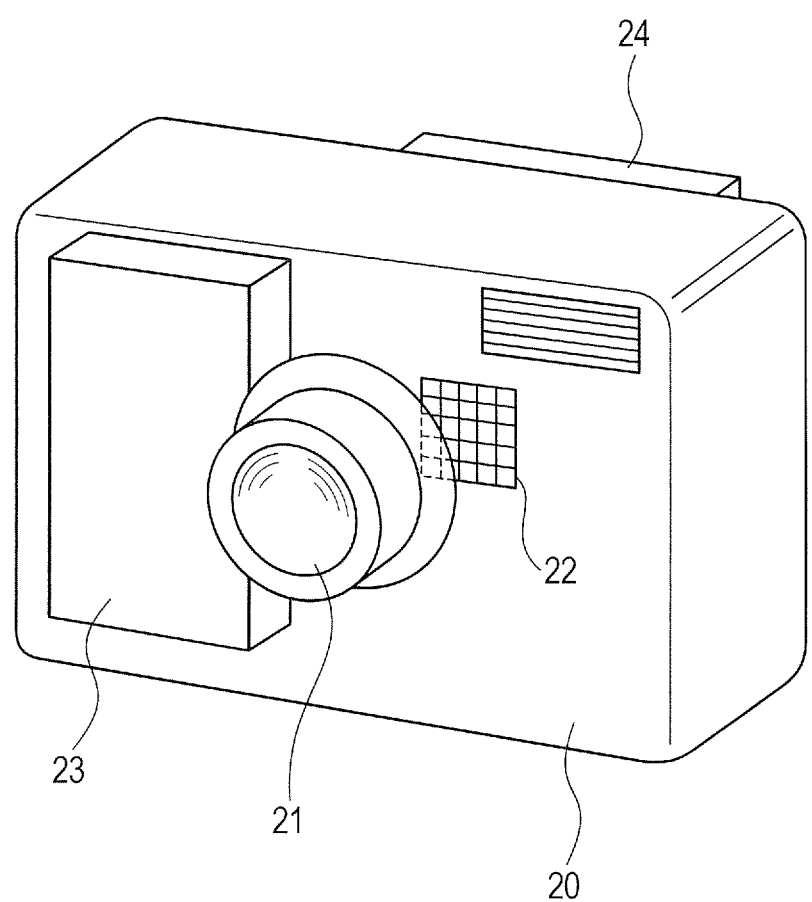
FIG. 11 is a schematic diagram showing a main part of an image pickup apparatus according to an embodiment of the present invention.

FIG. 11 is a schematic diagram showing a main part of a camera (an image pickup apparatus) including any of the zoom lenses of the present invention. The zoom lenses of Embodiments 1 to 5 are an image pickup optical system for use in an image pickup apparatus such as a video camera, a digital camera, or a silver-halide film camera. In the sectional views of the zoom lenses, the left side is the target (object) side (front), and the right side is the image side (back). In the sectional views of the zoom lenses, each lens unit is denoted by Li where "i" is the ordinal number of the lens unit from the object side. "LR" denotes a rear lens group including one or more lens units.

In FIGS. 1, 3, and 5 showing the sectional views of the zoom lenses of Embodiments 1 to 3, "L1" denotes the first lens unit having a positive refractive power, "L2" denotes the second lens unit having a negative refractive power, and "L3" denotes the third lens unit having a positive refractive power. "LR" denotes the rear lens group including, in order from the object side to the image side, a fourth lens unit L4 having a negative refractive power and a fifth lens unit L5 having a positive refractive power. The zoom lenses of Embodiments 1 to 3 are five-unit zoom lenses.

In FIG. 7 showing the sectional view of the zoom lens of Embodiment 4, "L1" denotes a first lens unit having a positive refractive power, "L2" denotes a second lens unit having a negative refractive power, and "L3" denotes a third lens unit having a positive refractive power. "LR" denotes a rear lens group including, in order from the object side to the image side, a fourth lens unit L4 having a positive refractive power, a fifth lens unit L5 having a negative refractive power, and a sixth lens unit L6 having a positive refractive power. The zoom lens of Embodiment 4 is a six-unit zoom lens.

In FIG. 9 showing the sectional view of the zoom lens of Embodiment 5, "L1" denotes a first lens unit having a positive refractive power, "L2" denotes a second lens unit having a negative refractive power, and "L3" denotes a third lens unit having a positive refractive power. "LR" denotes a rear lens group including, in order from the object side to the image side, a fourth lens unit L4 having a negative refractive power, a fifth lens unit L5 having a positive refractive power, and a sixth lens unit L6 having a positive refractive power. The zoom lens of Embodiment 5 is a six-unit zoom lens.

In the sectional views of the zoom lenses, "SP" denotes an aperture stop placed in the third lens unit L3. "FP" denotes flare stops, one of which is disposed near a lens of the third lens unit L3 closest to the object side and the other one of which is disposed on the image side of the third lens unit L3. The flare stops FP block undesirable light. "G" denotes an optical block such as an optical filter, a face plate, a crystal low-pass filter, an infrared cut filter, or the like.

"IP" denotes an image plane. When the zoom lens is used as an image pickup optical system for a video camera or a digital still camera, the image pickup surface of a solid-state image pickup element (photoelectric conversion element), such as a CCD sensor or a CMOS sensor, is disposed at the image plane IP. When the zoom lens is used as an image pickup optical system for a silver-halide film camera, a photosensitive surface, which is equivalent to a film plane, is disposed at the image plane IP. Arrows 5a to 5c or 6a to 6c indicate loci along which the respective lens units move during zooming from the wide angle end to the telephoto end and the direction in which the lens unit moves upon focusing.

In a part of each aberration diagram showing spherical aberration, "d" denotes a d-line (wavelength 587.6 nm), and "g" denotes a g-line (wavelength 435.8 nm). In a part showing astigmatism, "M" denotes a meridional image plane, and "S" denotes a sagittal image plane. Lateral chromatic aberration is indicated by a g-line. In addition, "ω" denotes a half-angle of view (which is the half of an angle of view), and "Fno" denotes an F-number. In the embodiments described below, the wide angle end and the telephoto end refer to available ends of the zoom range in which the zoom lens units can move on a mechanical optical axis.

The zoom lens of each embodiment includes, in order from the object side to the image side, the first lens unit L1 having a positive refractive power, the second lens unit L2 having a negative refractive power, the third lens unit L3 having a positive refractive power, and the rear lens group LR including one or more lens units. When zooming, the first lens unit L1, the second lens unit L2, and the third lens unit L3 move, changing the intervals between adjacent ones of the lens units.

The zoom lens satisfies the following conditions:

$$0.01 < f1/ft < 0.30 \quad (1)$$

$$9.0 < f1/fw < 20.0 \quad (2)$$

$$-0.40 < M2/M3 < 0.20 \quad (3)$$

where f1 is the focal length of the first lens unit L1, fw is the focal length of the entire system at the wide angle end, ft is the focal length of the entire system at the telephoto end, M2 is the amount by which the second lens unit L2 moves when zooming from the wide angle end to the telephoto end, and M3 is the amount by which the third lens unit L3 moves when zooming from the wide angle end to the telephoto end.

The amount by which a lens unit moves when zooming is defined by a difference in its position between the wide angle end on the optical axis and the telephoto end on the optical axis. The position of each lens unit is determined with reference to the image plane. For example, the position of the second lens unit at the wide angle end is defined based on a distance on the optical axis between the image plane and the second lens unit at the wide angle end. The sign of the amount of movement of a lens unit is positive when the lens unit is located closer to the object side at the telephoto end than at the wide angle end, and is negative when the lens unit is located closer to the image side at the telephoto end than at the wide angle end.

Technical meanings of the above-mentioned conditions are described. In Condition (1), the ratio of the focal length f1 of the first lens unit L1 to the focal length ft of the entire system at the telephoto end is defined appropriately to obtain a wide angle of view and a high zoom ratio while achieving size reduction of the entire system. If the focal length f1 of the first lens unit L1 is so small that the ratio of Condition (1) falls below the lower limit defined therein, axial chromatic aberration and lateral chromatic aberration on the telephoto end become large to an extent that is difficult to correct. If the focal length f1 of the first lens unit L1 is so large that the ratio of Condition (1) exceeds the upper limit defined therein, the overall lens length on the telephoto end becomes large, which hinders size reduction of the entire system.

In Condition (2), the ratio of the focal length f1 of the first lens unit L1 contributing to zooming to the focal length fw of the entire system at the wide angle end is defined appropriately to obtain a wide angle of view and a high zoom ratio while achieving size reduction of the entire system. If the focal length ft of the first lens unit L1 is so small relative to the focal length fw of the entire system at the wide angle end that the ratio of Condition (2) falls below the lower limit defined therein, it is difficult to correct lateral chromatic aberration at the wide angle end as the angle of view is increased. In addition, axial chromatic aberration and lateral chromatic aberration become large on the telephoto end during high zoom, to an extent that is difficult to correct.

Furthermore, it is difficult to give sufficient edge thickness to the positive lens constituting the first lens unit L1. Then, for manufacturing reasons, the effective diameter and the thickness of the lens unit have to be increased, which hinders size and thickness reduction of the entire system.

If the focal length f1 of the first lens unit L1 is so large relative to the focal length fw of the entire system at the wide angle end that the ratio of Condition (2) exceeds the upper limit defined therein, the amount by which the first lens unit L1 moves when zooming increases during high zoom. This increases the number of retractable-barrel steps for retraction of the lens system, entailing an increase in the barrel diameter and, in turn, an increase in the size of the entire system. Moreover, the increase in the amount by which the first lens unit L1 moves when zooming increases image blur and vibration sound associate with the zooming.

In Condition (3), the ratio of the amount M2 by which the second lens unit L2 moves when zooming to the amount M3 by which the third lens unit L3 moves when zooming is defined appropriately to obtain a high zoom ratio while achieving size reduction of the entire system. If the amount M2 by which the second lens unit L2 moves to the image side is so small relative to the amount M3 by which the third lens unit L3 moves to the object side that the ratio of Condition (3) falls below the lower limit defined therein, a high zoom ratio cannot be obtained without an increase in the overall lens length at the telephoto end.

The increase in the overall lens length at the telephoto end increases the effective diameter of the front lens, causing size increase of the entire system. In order to obtain a high zoom ratio while achieving size reduction, the refractive power of the second lens unit L2 needs to be increased. This in turn increases field curvature and lateral chromatic aberration at the wide angle end, to an extent that is difficult to correct. If the amount of movement M2 of the second lens unit L2 is so large relative to the amount of movement M3 of the third lens unit L3 with the second lens unit L2 and the third lens unit L3 moving in the same direction, that the ratio of Condition (3) exceeds the upper limit defined therein, chromatic aberration and spherical aberration are increased mainly at the telephoto end to an extent that is difficult to correct.

When configured as above, the zoom lens can be reduced in size, maintain high optical performance over the entire zoom range, have a wide angle of view and a high zoom ratio with a small effective diameter of the front lens, and provide small camera thickness when retracted.

Preferably, numbers in Conditions (1) to (3) are set as follows.

$$0.01 < f1/ft < 0.29 \quad (1a)$$

$$9.0 < f1/fw < 15.0 \quad (2a)$$

$$-0.398 < M2/M3 < 0.150 \quad (3a)$$

More preferably, numbers in Conditions (1a) to (3a) are set as follows.

$$0.050 < f1/ft < 0.285 \quad (1b)$$

$$9.8 < f1/fw < 15.0 \quad (2b)$$

$$-0.397 < M2/M3 < 0.150 \quad (3b)$$

When configured as above, the zoom lens can be reduced in size and maintain high optical performance over the entire zoom range with a wide angle of view and a high zoom ratio.

Still more preferably, the zoom lens of each embodiment satisfies at least one of the following conditions.

$$0.1 < M1/M3 < 3.0 \quad (4)$$

$$10.0 < \beta 2t/\beta 2w < 80.0 \quad (5)$$

$$-20.0 < M1/M2 < -1.0 \quad (6)$$

$$-5.0 < M2/fw < 0.0 \quad (7)$$

$$0.01 < D23t/fw < 0.20 \quad (8)$$

where M1 represents the amount by which the first lens unit L1 moves when zooming from the wide angle end to the telephoto end, $\beta 2w$ and $\beta 2t$ represent the lateral magnification of the second lens unit L2 at the wide angle end and at the telephoto end, respectively, and D23t represents an interval between the second lens unit L2 and the third lens unit L3 both at the telephoto end.

Technical meanings of the above-mentioned conditions are described next. In Condition (4), the ratio of the amount M1 by which the first lens unit L1 moves when zooming to the amount M3 by which the third lens unit L3 moves when zooming is defined appropriately to obtain a high zoom ratio while achieving size reduction of the entire system. If the amount of movement M1 of the first lens unit L1 is so small relative to the amount of movement M3 of the third lens unit L3 that the ratio of Condition (4) falls below the lower limit defined therein, a high zoom ratio cannot be obtained without an increase in the refractive power of the first lens unit L1. Then, the effective diameter of the front lens has to be increased to give sufficient edge thickness or the like, and this hinders size reduction of the entire system.

If the amount of movement M1 of the first lens unit L1 is so large relative to the amount of movement M3 of the third lens unit L3 that the ratio of Condition (4) exceeds the upper limit defined therein, the overall lens length at the telephoto end increases, which hinders size reduction of the entire system. The increase in the amount of movement M1 of the first lens unit L1 is unfavorable also because it increases image blur and vibration sound during zooming.

In Condition (5), the ratio of the lateral magnification $\beta 2w$ of the second lens unit L2 at the wide angle end to the lateral magnification $\beta 2t$ of the second lens unit L2 at the telephoto end is defined appropriately. If the lateral magnification $\beta 2t$ of the second lens unit L2 at the telephoto end is so small relative to the lateral magnification $\beta 2w$ of the second lens unit L2 at the wide angle end that the ratio of Condition (5) falls below the lower limit defined therein, a high zoom ratio is difficult to obtain. If the lateral magnification $\beta 2t$ of the second lens unit L2 at the telephoto end is so large relative to the lateral magnification $\beta 2w$ of the second lens unit L2 at the wide angle end that the ratio of Condition (5) exceeds the upper limit defined therein, it is difficult to favorably correct the various aberrations over the entire zoom range.

In Condition (6), the ratio of the amount M1 by which the first lens unit L1 moves when zooming to the amount M2 by which the second lens unit L2 moves when zooming is defined appropriately to obtain a high zoom ratio while achieving size reduction of the entire system. If the amount of movement M1 of the first lens unit L1 is so small (in absolute value) relative to the amount of movement M2 of the second lens unit L2 that the ratio of Condition (6) exceeds the upper limit defined therein, the effective diameter of the front lens is increased, which hinders size reduction of the entire system. Moreover, when the amount of movement M1 of the first lens unit L1 is decreased, the refractive power of the first lens unit L1 contributing mainly to chromatic aberration at the telephoto end is increased, which makes it difficult to correct chromatic aberration.

If the amount of movement M1 of the first lens unit L1 is so large (in absolute value) relative to the amount of movement M2 of the second lens unit L2 that the ratio of Condition (6) falls below the lower limit defined therein, the overall lens length at the telephoto end increases, which hinders size reduction of the entire system. The increase in the amount of movement M1 of the first lens unit L1 is unfavorable also because it increases image blur and vibration noise during zooming.

In Condition (7), the ratio of the amount M2 by which the second lens unit L2 moves when zooming from the wide angle end to the telephoto end to the focal length fw of the entire system at the wide angle end is defined appropriately to obtain a wide angle of view and a high zoom ratio. If the amount of movement M2 of the second lens unit L2 is so large relative to the focal length fw of the entire system at the wide angle end that the ratio of Condition (7) falls below the lower limit defined therein, a high zoom ratio cannot be obtained without an increase in the overall lens length at the telephoto end. Moreover, the effective diameter of the front lens has to be increased to ensure enough peripheral illumination, and this hinders size reduction of the entire system.

If the amount of movement M2 of the second lens unit L2 to the image side is so small relative to the focal length fw of the entire system at the wide angle end that the ratio of Condition (7) exceeds the upper limit defined therein, a high zoom ratio cannot be obtained without an increase (in absolute value) in the negative refractive power of the second lens unit L2. This makes it difficult to correct distortion and field curvature mainly near the wide angle end.

In Condition (8), the ratio of the interval D23t, which is the distance on the optical axis from the surface of the lens of the second lens unit L2 closest to the image side to the surface of the lens of the third lens unit L3 closest to the object side both at the telephoto end, to the focal length fw of the entire system is defined appropriately to obtain a high zoom ratio while achieving size reduction of the entire system. If the interval D23t between the second lens unit L2 and the third lens unit L3 at the telephoto end is so short relative to the focal length fw of the entire system at the wide angle end that the ratio of Condition (8) falls below the lower limit defined therein, the lenses physically interfere with surrounding mechanical members and the like. This hinders size reduction of the entire system.

If the interval D23t between the second lens unit L2 and the third lens unit L3 at the telephoto end is so large relative to the focal length fw of the entire system at the wide angle end that the ratio of Condition (8) exceeds the upper limit defined therein, the overall lens length and the effective diameter of the front lens are increased at the telephoto end. This hinders size reduction of the entire system.

Preferably, numbers in Conditions (4) to (8) may be set as follows to fully achieve the advantageous effects intended by the conditions given earlier.

$$0.1 < M1/M3 < 2.0 \quad (4a)$$

$$10.0 < \beta 2t/\beta 2w < 60.0 \quad (5a)$$

$$-20.0 < M1/M2 < -3.0 \quad (6a)$$

$$-3.0 < M2/fw < 0.0 \quad (7a)$$

$$0.01 < D23t/fw < 0.15 \quad (8a)$$

More preferably, numbers in Conditions (4a) to (8a) may be set as follows to fully achieve the advantageous effects intended by the conditions given earlier.

$$0.1 < M1/M3 < 1.5 \quad (4b)$$

$$10.0 < \beta 2t/\beta 2w < 50.0 \quad (5b)$$

$$-20.0 < M1/M2 < -4.0 \quad (6b)$$

$$-2.0 < M2/fw < 0.0 \quad (7b)$$

$$0.01 < D23t/fw < 0.10 \quad (8b)$$

Next, the zoom lenses of Embodiments 1 to 5 are described. In these embodiments, the rear lens group LR has a lens unit Ln having a negative refractive power, the lens unit Ln being constituted by a cemented lens formed by cementing a negative lens and a positive lens. The rear lens group LR also has a focus lens unit.

In the zoom lenses of Embodiments 1 and 2, each lens unit moves as follows when zooming from the wide angle end to the telephoto end. The first lens unit L1 moves along a locus convex to the image side. The second lens unit L2 moves to the image side non-linearly. The third lens unit L3 moves to the object side. The fourth lens unit L4 moves along a locus convex to the object side. The fifth lens unit L5 moves along a locus convex to the object side. The fifth lens unit L5 not only corrects displacement of the image plane associated with zooming, but also performs focusing by moving on the optical axis.

For the fifth lens unit L5, a solid curve line 5a represents a locus along which the fifth lens unit L5 moves to correct image plane variation caused by zooming when focusing for an object at infinity, and a dotted curve line 5b represents a locus along which the fifth lens unit L5 moves to correct image plane variation caused by zooming when focusing for a close-up object. When the focus is changed from infinity to close-up at the telephoto end, the fifth lens unit L5 moves toward the front side (to the object side) as shown with arrow 5c.

During zooming, the aperture stop SP and the flare stops FP move integrally with (along the same locus) the third lens unit L3. The focusing from infinity to close-up may be performed by the fourth lens unit L4. The behavior of the fourth lens unit L4 during the focusing is the same as that of the fifth lens unit L5.

Embodiment 3 differs from Embodiments 1 and 2 in that the second lens unit L2 moves along a locus convex to the image side when zooming from the wide angle end to the telephoto end, and is located closer to the object side on the telephoto end than on the wide angle end. In other words, the amount of movement M2 of the second lens unit L2 is M2<0. Other configurations are the same as those of Embodiments 1 and 2.

In the zoom lens of Embodiment 4, each lens unit moves as follows when zooming from the wide angle end to the telephoto end. The first lens unit L1 moves along a locus convex to the image side. The second lens unit L2 moves to the image side non-linearly. The third lens unit L3 moves to the object side. The fourth lens unit L4 moves to the object side. The fifth lens unit L5 moves along a locus convex to the object side. The sixth lens unit L6 moves along a locus convex to the object side.

The sixth lens unit L6 not only corrects the displacement of the image plane associated with zooming, but also performs focusing by moving on the optical axis. For the sixth lens unit L6, a solid curve line 6a represents a locus along which the sixth lens unit L6 moves to correct image plane variation caused by zooming when focusing for an object at infinity, and a dotted curve line 6b represents a locus along which the sixth lens unit L6 to correct image plane variation caused by zooming when focusing for a close object. When the focus is changed from infinity to close-up at the telephoto end, the sixth lens unit L6 moves toward the rear side (to the image side) as shown with arrow 6c.

During zooming, the aperture stop SP and the flare stops FP move (along the same locus) integrally with the third lens unit L3. The focusing from infinity to close-up may be performed by the fifth lens unit L5. The behavior of the fifth lens unit L5 during the focusing is the same as that of the sixth lens unit L6.

In the zoom lens of Embodiment 5, each lens unit moves as follows when zooming from the wide angle end to the telephoto end. The first lens unit L1 moves along a locus convex to the image side. The second lens unit L2 moves to the image side non-linearly. The third lens unit L3 moves to the object side. The fourth lens unit L4 moves along a locus convex to the object side. The fifth lens unit L5 moves along a locus convex to the object side. The sixth lens unit L6 does not move. The fifth lens unit L5 not only corrects displacement of the image plane associated with zooming, but also performs focusing by moving on the optical axis.

For the fifth lens unit L5, a solid curve line 5a represents a locus along which the fifth lens unit L5 moves to correct image plane variation caused by zooming when focusing for an object at infinity, and a dotted curve line 5b represents a locus along which the fifth lens unit L5 moves to correct image plane variation caused by zooming when focusing for a close object. When the focus is changed from infinity to close-up at the telephoto end, the fifth lens unit L5 moves toward the front side (to the object side) as shown with arrow 5c.

During zooming, the aperture stop SP and the flare stops FP move (along the same locus) integrally with the third lens unit L3. The focusing may be performed by the fourth lens unit L4 having a negative refractive power. When focusing from infinity to close up, the fourth lens unit L4 moves to the image side.

In each embodiment, when zooming, the first lens unit L1 and the third lens unit L3 both move closer to the object side at the telephoto end than at the wide angle end. This decreases the overall lens length at the wide angle end, thereby achieving size reduction of the front lens and a high zoom ratio.

In particular, the third lens unit L3 in each embodiment moves to the object side when zooming and thereby performs part of the zooming. Further, the first lens unit L1 having a positive refractive power moves to the object side to cause the second lens unit L2 to produce a large zooming effect. Thus, a high zoom ratio is obtained without an excessive increase in the refractive powers of the first lens unit L1 and the second lens unit L2.

For image blur correction, the third lens unit L3 having a positive refractive power may move in a direction having a component perpendicular to the optical axis so that the imaging position may move in a direction perpendicular to the optical axis. This facilitates correction of image blur caused by vibration of the entire zoom lens.

Thereby, image stabilization is achieved without adding an optical component such as a variable angle prism or an additional lens unit for image stabilization and therefore without an increase in the size of the entire optical system. The third lens unit L3 moves in the direction perpendicular to the optical axis to correct image blur in each embodiment. The image blur can be corrected when the third lens unit L3 moves in a direction having a component perpendicular to the optical axis.

For example, if complication in lens barrel structure is allowed, the image blur correction may be performed by the third lens unit L3 which may be configured to turn about the optical axis. The image blur correction may be performed by part of the third lens unit L3. In each embodiment, the aperture stop SP moves integrally with the third lens unit L3 during zooming. This can shorten the interval between the second lens unit L2 and the third lens unit L3 at the telephoto end, facilitating reduction in the overall lens length at the telephoto end and in turn a high zoom ratio.

Next, the configuration of each lens unit in Embodiments 1 to 5 is described. In Embodiment 1, the first lens unit L1 consists of, in order from the object side to the image side, a negative lens, a positive lens, and a positive lens. This configuration allows favorable correction of spherical aberration and chromatic aberration caused to obtain a high zoom ratio. The second lens unit L2 consists of, in order from the object side to the image side, a negative lens, a negative lens, and a positive lens.

The third lens unit L3 consists of, in order from the object side to the image side, a positive lens, a negative lens, and a positive lens. This configuration allows reduction in aberration fluctuations during the image blur correction by the third lens unit L3, and also allows favorable correction of spherical aberration and coma at the middle zoom position. Use of the aspherical surface enables reduction in variation in spherical aberration associated with zooming.

The fourth lens unit L4 (the lens unit Ln) consists of a cemented lens formed by cementing a negative lens and a positive lens arranged in order from the object side to the image side. This configuration allows favorable correction of chromatic aberration at the middle zoom position. The fifth lens unit L5 consists of, in order from the object side to the image side, a positive lens and a negative lens. This configuration allows reduction in variation in aberration, especially chromatic aberration, caused when the fifth lens unit L5 performs focusing.

In Embodiment 2, the first lens unit L1 consists of, in order from the object side to the image side, a negative lens, a positive lens, a positive lens, and a positive lens. The configurations of the second lens unit L2, the fourth lens unit L4, and the fifth lens unit L5 are the same as those in Embodiment 1. The third lens unit L3 consists of, in order from the object side to the image side, a positive lens, a positive lens, a negative lens, and a positive lens. Such configuration of Embodiment 2 produces the same advantageous effects produced by Embodiment 1. In Embodiment 3, the configurations of the first lens unit L1 to the fifth lens unit L5 are the same as those of Embodiment 1. Thus, Embodiment 3 produces the same advantageous effects as those produced by Embodiment 1.

In Embodiment 4, the configurations of the first lens unit L1 and the second lens unit L2 are the same as those of Embodiment 1. The third lens unit L3 consists of, in order from the object side to the image side, a positive lens, a positive lens, a negative lens, and a positive lens. The fourth lens unit L4 consists of a positive lens. The fifth lens unit L5 (the lens unit Ln) consists of, in order from the object side to the image side, a negative lens and a positive lens. The sixth lens unit L6 consists of, in order from the object side to the image side, a positive lens and a negative lens. The sixth lens unit L6 performs focusing. Such configuration of Embodiment 6 produces the same advantageous effects as those produced by Embodiment 1.

In Embodiment 5, the configurations of the first lens unit L1, the second lens unit L2, the fourth lens unit L4, and the fifth lens unit L5 are the same as those of Embodiment 1. The third lens unit L3 consists of, in order from the object side to the image side, a positive lens, a positive lens, a negative lens, and a positive lens. The sixth lens unit L6 consists of a positive lens. Such configuration of Embodiment 5 produces the same advantageous effects produced by Embodiment 1.

Next, a digital still camera according to an embodiment is described with reference to FIG. 11. This digital still camera uses any of the zoom lenses of Embodiments 1 to 5 as its image pickup optical system.

In FIG. 11, reference numeral 20 denotes a camera body, and 21 denotes an image pickup optical system formed by any of the zoom lenses of Embodiments 1 to 5. Reference numeral 22 denotes a solid-state image pickup element (photoelectric conversion element), such as a CCD sensor or a CMOS sensor, which is incorporated in the camera body 20 and configured to receive an image of an object formed by the image pickup optical system 21. Reference numeral 23 denotes a memory configured to record information that constitutes the object image photoelectrically converted by the solid-state image pickup element 22. Reference numeral 24 denotes a finder which is formed by a liquid crystal display or the like and used to observe the object image formed on the solid-state image pickup element 22.

When the zoom lens of the present invention is thus applied to an image pickup apparatus such as a digital still camera, the image pickup apparatus can be compact and deliver high optical performance.

Next, numerical data for each of Embodiments 1 to 5 of the present invention are demonstrated. In the following numerical data for each embodiment, represents the ordinal number of an optical surface from the object side, "ri" represents the radius of curvature of the i-th optical surface (or simply the i-th surface), "di" represents an interval between the i-th surface and the i+1-th surface, and "ndi" and "vdi" represent a refractive index and an Abbe number, respectively, of material of the i-th optical member relative to the d-line.

In addition, with "k" representing an eccentricity, "A4", "A6", and "A8" representing aspherical coefficients, and "x" representing a displacement from the surface vertex along the optical axis at a height h from the optical axis, an aspherical shape is expressed as follows:

$$x=(h^2/R)/[1+[1-(1+k)(h/R)^2]^{1/2}]+A4h^4+A6h^6+A8h^8$$

where R represents the paraxial radius of curvature.

In addition, "e-Z" indicates "$10^{-z}$". In the following numerical data, the last two surfaces are surfaces of an optical block such as a filter or a face plate. In Embodiments 1 to 5, BF represents the back focus in air, which is the distance from the rear surface of the last lens to a paraxial image plane. The overall lens length is a distance combining the back focus BF and a distance from a surface of the lens closest to the object to a surface of the last lens. Table 1 shows correspondences between the conditions described above and Embodiments 1 to 5.

[Embodiment 1]

[unit: mm]
Surface Data

| surface no. i | ri | di | ndi | vdi |
|---|---|---|---|---|
| 1 | 54.031 | 0.90 | 1.91082 | 35.3 |
| 2 | 27.319 | 4.00 | 1.49700 | 81.5 |
| 3 | −647.598 | 0.05 | | |
| 4 | 27.628 | 3.17 | 1.59282 | 68.6 |
| 5 | 221.133 | (variable) | | |
| 6 | 309.173 | 0.45 | 1.83481 | 42.7 |
| 7 | 6.139 | 3.41 | | |
| 8 | −20.940 | 0.35 | 1.77250 | 49.6 |
| 9 | 20.940 | 0.05 | | |
| 10 | 12.285 | 1.65 | 1.92286 | 18.9 |
| 11 | 76.271 | (variable) | | |
| 12 (FP) | ∞ | −0.60 | | |
| 13* | 6.756 | 1.97 | 1.49710 | 81.6 |
| 14* | 92.164 | 1.34 | | |
| 15 (stop) | ∞ | 0.76 | | |
| 16 | 9.460 | 0.40 | 2.00069 | 25.5 |
| 17 | 6.646 | 0.30 | | |
| 18* | 10.011 | 1.71 | 1.49710 | 81.6 |
| 19* | −77.597 | 0.10 | | |
| 20 (FP) | ∞ | (variable) | | |
| 21 | −19.980 | 0.40 | 1.48749 | 70.2 |
| 22 | 8.848 | 0.90 | 1.51742 | 52.4 |
| 23 | 19.646 | (variable) | | |
| 24* | 14.461 | 3.50 | 1.53160 | 55.8 |
| 25 | −14.795 | 0.05 | | |
| 26 | −19.858 | 0.50 | 1.95906 | 17.5 |
| 27 | −34.535 | (variable) | | |
| 28 | ∞ | 1.00 | 1.51633 | 64.1 |
| 29 | ∞ | 1.00 | | |
| image plane | ∞ | | | |

Aspherical Surface Data

13th surface k = −9.77429e−002
A4 = −2.05823e−005
A6 = 3.53721e−006
A8 = −9.26502e−007

14th surface k = 0.00000e+000
A4 = 3.45712e−004
A6 = −1.45454e−005
A8 = −7.34924e−007

18th surface k = −2.66556e+000
A4 = 1.11848e−003
A6 = −2.96183e−005
A8 = −4.65797e−007

19th surface k = 0.00000e+000
A4 = 9.88118e−004
A6 = −2.73710e−006

24th surface k = −1.26846e+000
A4 = −7.70550e−006
A6 = −2.54210e−007

Various Data

| | | | | | |
|---|---|---|---|---|---|
| zoom ratio | 37.76 | | | | |
| focal length | 4.43 | 11.43 | 167.30 | 80.00 | 6.52 |
| F-number | 3.33 | 4.44 | 7.10 | 5.43 | 3.76 |
| half angle of view (degs.) | 36.31 | 18.72 | 1.33 | 2.77 | 29.69 |
| image height | 3.25 | 3.88 | 3.88 | 3.88 | 3.72 |
| overall lens length | 66.07 | 69.85 | 93.49 | 92.03 | 64.22 |
| BF | 8.66 | 15.36 | 4.41 | 17.39 | 11.08 |
| d5 | 0.41 | 8.98 | 34.18 | 31.47 | 2.78 |
| d11 | 26.90 | 12.62 | 0.98 | 2.31 | 19.29 |
| d20 | 1.85 | 2.16 | 5.04 | 5.54 | 1.99 |
| d23 | 2.89 | 5.36 | 23.53 | 9.96 | 3.72 |
| d27 | 7.00 | 13.70 | 2.75 | 15.73 | 9.42 |

Lens Unit Data

| unit no. | frontmost surface | focal length |
|---|---|---|
| 1 | 1 | 47.06 |
| 2 | 6 | −6.74 |
| 3 | 12 | 12.68 |
| 4 | 21 | −20.91 |
| 5 | 24 | 19.70 |
| 6 | 28 | ∞ |

[Second Embodiment]

[unit: mm]
Surface Data

| surface no. i | ri | di | ndi | vdi |
|---|---|---|---|---|
| 1 | 54.984 | 0.90 | 1.91082 | 35.3 |
| 2 | 27.552 | 3.60 | 1.49700 | 81.5 |
| 3 | 226.851 | 0.05 | | |
| 4 | 31.740 | 2.45 | 1.49700 | 81.5 |
| 5 | 94.559 | 0.05 | | |
| 6 | 36.744 | 2.30 | 1.59282 | 68.6 |
| 7 | 193.807 | (variable) | | |
| 8 | 375.862 | 0.45 | 1.83481 | 42.7 |
| 9 | 5.904 | 3.39 | | |
| 10 | −19.024 | 0.35 | 1.80400 | 46.6 |
| 11 | 19.024 | 0.05 | | |
| 12 | 12.082 | 1.68 | 1.92286 | 18.9 |
| 13 | 162.609 | (variable) | | |
| 14 (FP) | ∞ | −0.60 | | |
| 15* | 6.985 | 1.97 | 1.49710 | 81.6 |
| 16* | 69.690 | 1.34 | | |
| 17 (stop) | ∞ | 0.76 | | |
| 18 | 8.627 | 1.00 | 1.48749 | 70.2 |
| 19 | 10.053 | 0.30 | 1.91082 | 35.3 |
| 20 | 5.371 | 0.35 | | |
| 21 | 7.177 | 2.00 | 1.49710 | 81.6 |
| 22* | −35.927 | 0.10 | | |
| 23 (FP) | ∞ | (variable) | | |
| 24 | −16.323 | 0.40 | 1.48749 | 70.2 |
| 25 | 6.759 | 0.95 | 1.51742 | 52.4 |
| 26 | 21.069 | (variable) | | |
| 27* | 14.928 | 3.60 | 1.55332 | 71.7 |
| 28 | −15.143 | 0.50 | 1.95906 | 17.5 |
| 29 | −20.347 | (variable) | | |
| 30 | ∞ | 1.00 | 1.51633 | 64.1 |
| 31 | ∞ | 1.00 | | |
| image plane | ∞ | | | |

Aspherical Surface Data

15th surface k = 5.36260e−001
A4 = −4.20954e−004
A6 = −1.15764e−005
A8 = 3.04832e−007

16th surface k = 0.00000e+000
A4 = −7.50382e−005
A6 = −8.35378e−007
A8 = 7.00620e−007

-continued

| 22nd surface |
|---|
| k = 0.00000e+000 |
| A4 = 1.09347e−004 |
| A6 = −1.66941e−005 |

| 27th surface |
|---|
| k = −7.88281e−001 |
| A4 = −1.85108e−005 |
| A6 = 8.76221e−008 |

Various Data

| | | | | | |
|---|---|---|---|---|---|
| zoom ratio | 38.37 | | | | |
| focal length | 4.43 | 10.02 | 170.00 | 69.97 | 6.32 |
| F-number | 3.39 | 4.38 | 7.10 | 5.64 | 3.78 |
| half angle of view (degs.) | 36.31 | 21.15 | 1.31 | 3.17 | 30.48 |
| image height | 3.25 | 3.88 | 3.88 | 3.88 | 3.72 |
| overall lens length | 67.54 | 69.19 | 91.68 | 89.78 | 65.01 |
| BF | 8.98 | 15.09 | 4.40 | 19.54 | 11.39 |
| d7 | 0.46 | 6.64 | 31.71 | 28.22 | 2.11 |
| d13 | 26.09 | 13.24 | 0.98 | 2.91 | 18.88 |
| d23 | 1.85 | 2.31 | 5.96 | 5.99 | 2.15 |
| d26 | 2.22 | 3.97 | 20.70 | 5.18 | 2.53 |
| d29 | 7.32 | 13.43 | 2.74 | 17.88 | 9.73 |

Lens Unit Data

| unit no. | frontmost surface | focal length |
|---|---|---|
| 1 | 1 | 44.22 |
| 2 | 8 | −6.32 |
| 3 | 14 | 12.95 |
| 4 | 24 | −19.78 |
| 5 | 27 | 18.02 |
| 6 | 30 | ∞ |

[Third Embodiment]

[unit: mm]
Surface Data

| surface no. i | ri | di | ndi | vdi |
|---|---|---|---|---|
| 1 | 54.220 | 0.90 | 1.91082 | 35.3 |
| 2 | 26.809 | 4.20 | 1.49700 | 81.5 |
| 3 | −561.206 | 0.05 | | |
| 4 | 27.232 | 3.30 | 1.59282 | 68.6 |
| 5 | 249.179 | (variable) | | |
| 6 | −567.803 | 0.45 | 1.83481 | 42.7 |
| 7 | 6.047 | 3.41 | | |
| 8 | −19.440 | 0.35 | 1.77250 | 49.6 |
| 9 | 19.440 | 0.05 | | |
| 10 | 12.130 | 1.65 | 1.92286 | 18.9 |
| 11 | 94.339 | (variable) | | |
| 12 (FP) | ∞ | −0.60 | | |
| 13* | 7.314 | 2.03 | 1.49710 | 81.6 |
| 14* | 57.908 | 1.34 | | |
| 15 (stop) | ∞ | 0.76 | | |
| 16 | 9.256 | 0.40 | 2.00069 | 25.5 |
| 17 | 6.764 | 0.35 | | |
| 18* | 11.989 | 2.00 | 1.49710 | 81.6 |
| 19* | −54.486 | 0.10 | | |
| 20 (FP) | ∞ | (variable) | | |
| 21 | −13.566 | 0.40 | 1.48749 | 70.2 |
| 22 | 11.911 | 1.50 | 1.51742 | 52.4 |
| 23 | −48.873 | (variable) | | |
| 24* | 18.985 | 3.50 | 1.53160 | 55.8 |
| 25 | −12.965 | 0.05 | | |
| 26 | −13.794 | 0.50 | 1.95906 | 17.5 |
| 27 | −21.357 | (variable) | | |
| 28 | ∞ | 1.00 | 1.51633 | 64.1 |
| 29 | ∞ | 1.00 | | |
| image plane | ∞ | | | |

-continued

Aspherical Surface Data

| 13th surface |
|---|
| k = −1.42527e−002 |
| A4 = −2.67758e−005 |
| A6 = −5.21280e−006 |
| A8 = −5.49474e−007 |

| 14th surface |
|---|
| k = 0.00000e+000 |
| A4 = 4.38468e−004 |
| A6 = −2.46625e−005 |
| A8 = −2.30508e−007 |

| 18th surface |
|---|
| k = −1.81040e+000 |
| A4 = 1.22671e−003 |
| A6 = −1.87544e−005 |
| A8 = 8.55101e−008 |

| 19th surface |
|---|
| k = 0.00000e+000 |
| A4 = 9.61999e−004 |
| A6 = 6.46407e−006 |

| 24th surface |
|---|
| k = −3.95679e+000 |
| A4 = 4.74186e−005 |
| A6 = −3.29907e−007 |

Various Data

| | | | | | |
|---|---|---|---|---|---|
| zoom ratio | 37.75 | | | | |
| focal length | 4.43 | 12.23 | 167.30 | 78.77 | 6.68 |
| F-number | 3.15 | 4.15 | 7.10 | 5.16 | 3.50 |
| half angle of view (degs.) | 36.30 | 17.58 | 1.33 | 2.82 | 29.11 |
| image height | 3.25 | 3.88 | 3.88 | 3.88 | 3.72 |
| overall lens length | 65.56 | 70.18 | 102.06 | 99.69 | 63.93 |
| BF | 10.24 | 18.65 | 6.46 | 19.83 | 13.26 |
| d5 | 0.96 | 9.62 | 33.46 | 30.96 | 3.36 |
| d11 | 23.96 | 9.83 | 0.98 | 2.09 | 16.36 |
| d20 | 1.85 | 1.55 | 8.65 | 8.30 | 1.78 |
| d23 | 1.87 | 3.84 | 25.82 | 11.81 | 2.48 |
| d27 | 8.58 | 16.99 | 4.80 | 18.17 | 11.60 |

Lens Unit Data

| unit no. | frontmost surface | focal length |
|---|---|---|
| 1 | 1 | 46.23 |
| 2 | 6 | −6.32 |
| 3 | 12 | 14.28 |
| 4 | 21 | −44.73 |
| 5 | 24 | 23.04 |
| 6 | 28 | ∞ |

[Embodiment 4]

[unit: mm]
Surface Data

| surface no. i | ri | di | ndi | vdi |
|---|---|---|---|---|
| 1 | 55.708 | 0.90 | 1.91082 | 35.3 |
| 2 | 27.826 | 4.10 | 1.49700 | 81.5 |
| 3 | −427.985 | 0.05 | | |
| 4 | 27.897 | 3.35 | 1.59282 | 68.6 |
| 5 | 220.238 | (variable) | | |
| 6 | 214.663 | 0.45 | 1.83481 | 42.7 |
| 7 | 6.063 | 3.39 | | |
| 8 | −20.442 | 0.35 | 1.80400 | 46.6 |
| 9 | 20.442 | 0.05 | | |
| 10 | 12.272 | 1.68 | 1.92286 | 18.9 |
| 11 | 105.896 | (variable) | | |

-continued

| | | | | |
|---|---|---|---|---|
| 12 (FP) | ∞ | −0.60 | | |
| 13* | 7.218 | 1.97 | 1.49710 | 81.6 |
| 14* | 59.784 | 1.34 | | |
| 15 (stop) | ∞ | 0.76 | | |
| 16 | 7.739 | 1.00 | 1.48749 | 70.2 |
| 17 | 10.858 | 0.30 | 1.91082 | 35.3 |
| 18 | 5.424 | 0.35 | | |
| 19* | 7.295 | 1.80 | 1.49710 | 81.6 |
| 20* | −100.957 | 0.10 | | |
| 21 (FP) | ∞ | (variable) | | |
| 22 | 68.509 | 0.80 | 1.48749 | 70.2 |
| 23 | −67.699 | (variable) | | |
| 24* | −15.630 | 0.40 | 1.48749 | 70.2 |
| 25 | 4.270 | 1.20 | 1.51742 | 52.4 |
| 26 | 15.351 | (variable) | | |
| 27* | 16.274 | 3.50 | 1.53160 | 55.8 |
| 28 | −12.830 | 0.05 | | |
| 29 | −13.838 | 0.50 | 1.95906 | 17.5 |
| 30 | −20.516 | (variable) | | |
| 31 | ∞ | 1.00 | 1.51633 | 64.1 |
| 32 | ∞ | 1.00 | | |
| image plane | ∞ | | | |

Aspherical Surface Data

13th surface k = −1.54711e−001
A4 = −5.40365e−004
A6 = 1.58409e−005
A8 = −2.38593e−007

14th surface k = 0.00000e+000
A4 = −8.53382e−004
A6 = 6.02061e−005
A8 = −1.41900e−006

19th surface k = 0.00000e+000
A4 = −1.12710e−003
A6 = 1.26093e−004
A8 = −1.24189e−006

20th surface k = 0.00000e+000
A4 = −6.20186e−004
A6 = 7.20951e−005

24th surface k = 0.00000e+000
A4 = −9.91428e−005
A6 = 3.26813e−006
A8 = −1.21494e−008

27th surface k = −1.09302e+000
A4 = 3.17431e−007
A6 = −3.55563e−007

Various Data

| | | | | | |
|---|---|---|---|---|---|
| zoom ratio | 47.35 | | | | |
| focal length | 4.43 | 11.17 | 209.97 | 88.57 | 6.47 |
| F-number | 3.51 | 4.49 | 8.33 | 5.70 | 3.91 |
| half angle of view (degs.) | 36.28 | 19.14 | 1.06 | 2.51 | 29.92 |
| image height | 3.25 | 3.88 | 3.88 | 3.88 | 3.72 |
| overall lens length | 69.84 | 73.62 | 97.35 | 95.87 | 67.99 |
| BF | 7.37 | 13.91 | 2.91 | 19.10 | 9.70 |
| d5 | 0.45 | 9.04 | 34.42 | 31.69 | 2.82 |
| d11 | 29.20 | 14.93 | 0.98 | 2.69 | 21.58 |
| d21 | 0.74 | 1.53 | 4.09 | 3.84 | 1.02 |
| d23 | 1.74 | 1.49 | 1.96 | 2.66 | 1.71 |
| d26 | 2.55 | 4.94 | 25.21 | 8.10 | 3.36 |
| d30 | 5.71 | 12.25 | 1.25 | 17.44 | 8.04 |

Lens Unit Data

| unit no. | frontmost surface | focal length |
|---|---|---|
| 1 | 1 | 47.16 |
| 2 | 6 | −6.64 |
| 3 | 12 | 13.87 |
| 4 | 22 | 69.98 |
| 5 | 24 | −17.02 |
| 6 | 27 | 19.95 |
| 7 | 31 | ∞ |

[Embodiment 5]

[unit: mm]
Surface Data

| surface no. i | ri | di | ndi | vdi |
|---|---|---|---|---|
| 1 | 55.683 | 0.90 | 1.91082 | 35.3 |
| 2 | 27.820 | 4.10 | 1.49700 | 81.5 |
| 3 | −427.985 | 0.05 | | |
| 4 | 27.918 | 3.35 | 1.59282 | 68.6 |
| 5 | 220.238 | (variable) | | |
| 6 | 219.052 | 0.45 | 1.83481 | 42.7 |
| 7 | 6.067 | 3.39 | | |
| 8 | −20.588 | 0.35 | 1.80400 | 46.6 |
| 9 | 20.588 | 0.05 | | |
| 10 | 12.227 | 1.68 | 1.92286 | 18.9 |
| 11 | 108.527 | (variable) | | |
| 12 (FP) | ∞ | −0.60 | | |
| 13* | 7.162 | 1.97 | 1.49710 | 81.6 |
| 14* | 64.492 | 1.34 | | |
| 15 (stop) | ∞ | 0.76 | | |
| 16 | 7.739 | 1.00 | 1.48749 | 70.2 |
| 17 | 10.782 | 0.30 | 1.91082 | 35.3 |
| 18 | 5.444 | 0.35 | | |
| 19* | 7.157 | 1.80 | 1.49710 | 81.6 |
| 20* | −83.211 | 0.10 | | |
| 21 (FP) | ∞ | (variable) | | |
| 22* | −16.305 | 0.40 | 1.48749 | 70.2 |
| 23 | 5.682 | 0.95 | 1.51742 | 52.4 |
| 24 | 17.674 | (variable) | | |
| 25* | 15.602 | 3.50 | 1.53160 | 55.8 |
| 26 | −13.129 | 0.05 | | |
| 27 | −14.429 | 0.50 | 1.95906 | 17.5 |
| 28 | −20.516 | (variable) | | |
| 29 | −52.084 | 1.00 | 1.51633 | 64.1 |
| 30 | −26.106 | 0.46 | | |
| 31 | ∞ | 1.00 | 1.51633 | 64.1 |
| 32 | ∞ | 1.00 | | |
| image plane | ∞ | | | |

Aspherical Surface Data

13th surface k = 1.12221e−002
A4 = −4.17324e−004
A6 = 1.59616e−005
A8 = −8.97615e−007

14th surface k = 0.00000e+000
A4 = −4.92637e−004
A6 = 4.80553e−005
A8 = −2.14142e−006

19th surface k = 0.00000e+000
A4 = −5.80059e−004
A6 = 1.06463e−004
A8 = −3.51172e−006

-continued

20th surface k = 0.00000e+000
A4 = −1.57166e−004
A6 = 5.62715e−005

22nd surface k = 0.00000e+000
A4 = −1.43529e−004
A6 = 2.04449e−005
A8 = −5.42712e−007

25th surface k = −1.25514e+000
A4 = −5.23205e−006
A6 = −5.03992e−007

Various Data

| zoom ratio | 45.12 | | | | |
|---|---|---|---|---|---|
| focal length | 4.41 | 11.26 | 198.88 | 87.32 | 6.46 |
| F-number | 3.60 | 4.77 | 8.14 | 5.72 | 4.08 |
| half angle of view (degs.) | 36.44 | 18.99 | 1.12 | 2.54 | 29.93 |
| image height | 3.25 | 3.88 | 3.88 | 3.88 | 3.72 |
| overall lens length | 69.85 | 73.65 | 97.52 | 96.03 | 68.01 |
| BF | 2.12 | 2.12 | 2.12 | 2.12 | 2.12 |
| d5 | 0.43 | 9.05 | 34.67 | 31.92 | 2.81 |
| d11 | 29.11 | 14.64 | 0.92 | 2.54 | 21.43 |
| d21 | 1.85 | 2.56 | 5.38 | 5.92 | 2.16 |
| d24 | 1.45 | 3.85 | 24.79 | 8.18 | 2.25 |
| d28 | 7.16 | 13.69 | 1.89 | 17.61 | 9.50 |

Lens Unit Data

| unit no. | frontmost surface | focal length |
|---|---|---|
| 1 | 1 | 47.18 |
| 2 | 6 | −6.71 |
| 3 | 12 | 13.29 |
| 4 | 22 | −18.33 |
| 5 | 25 | 18.81 |
| 6 | 29 | 100.06 |
| 7 | 31 | ∞ |

TABLE 1

| Conditions | Emb. 1 | Emb. 2 | Emb. 3 | Emb. 4 | Emb. 5 |
|---|---|---|---|---|---|
| (1) $0.01 < f1/ft < 0.30$ | 0.281 | 0.260 | 0.276 | 0.225 | 0.237 |
| (2) $9.0 < f1/fw < 20.0$ | 10.624 | 9.982 | 10.432 | 10.633 | 10.704 |
| (3) $-0.40 < M2/M3 < 0.20$ | −0.324 | −0.395 | 0.148 | −0.297 | −0.304 |
| (4) $0.1 < M1/M3 < 3.0$ | 1.401 | 1.341 | 1.353 | 1.264 | 1.280 |
| (5) $10.0 < \beta 2t/\beta 2w < 80.0$ | 13.010 | 13.859 | 11.518 | 13.777 | 15.366 |
| (6) $-20.0 < M1/M2 < -1.0$ | −4.318 | −3.398 | 9.126 | −4.255 | −4.205 |
| (7) $-5.0 < M2/fw < 0.0$ | −1.433 | −1.604 | 0.903 | −1.458 | −1.492 |
| (8) $0.01 < D23t/fw < 0.20$ | 0.085 | 0.086 | 0.086 | 0.086 | 0.073 |

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2015-172770, filed Sep. 2, 2015, which is hereby incorporated by reference herein in its entirety.

What is claimed is:

1. A zoom lens comprising, in order from an object side to an image side:
    a first lens unit having a positive refractive power, a second lens unit having a negative refractive power, a third lens unit having a positive refractive power, and a rear lens group including one or more lens units,
    wherein during zooming, the first lens unit, the second lens unit, and the third lens unit move, thereby changing intervals between adjacent ones of these lens units, and the following conditions are satisfied:

$$0.01 < f1/ft < 0.30$$

$$9.0 < f1/fw < 20.0$$

$$-0.40 < M2/M3 < 0.20$$

where f1 is a focal length of the first lens unit, fw is a focal length of the zoom lens at a wide angle end, ft is a focal length of the zoom lens at a telephoto end, M2 is an amount by which the second lens unit moves when zooming from the wide angle end to the telephoto end, and M3 is an amount by which the third lens unit moves when zooming from the wide angle end to the telephoto end.

2. The zoom lens according to claim 1, wherein the following condition is satisfied:

$$0.1 < M1/M3 < 3.0$$

where M1 is an amount by which the first lens unit moves when zooming from the wide angle end to the telephoto end.

3. The zoom lens according to claim 1, wherein the following condition is satisfied:

$$10.0 < \beta 2t/\beta 2w < 80.0$$

where β2w is a lateral magnification of the second lens unit at the wide angle end, and β2t is a lateral magnification of the second lens unit at the telephoto end.

4. The zoom lens according to claim 1, wherein the following condition is satisfied:

$$-20.0 < M1/M2 < -1.0$$

where M1 is an amount by which the first lens unit moves when zooming from the wide angle end to the telephoto end.

5. The zoom lens according to claim 1, wherein the following condition is satisfied:

$$-5.0 < M2/fw < 0.0.$$

6. The zoom lens according to claim 1, wherein the following condition is satisfied:

$$0.01 < D23t/fw < 0.20$$

where D23t is an interval between the second lens unit and the third lens unit at the telephoto end.

7. The zoom lens according to claim 1, wherein
    the rear lens group includes a lens unit Ln having a negative refractive power, and
    the lens unit Ln consists of a cemented lens formed by cementing a negative lens and a positive lens.

8. The zoom lens according to claim 1, wherein
the rear lens group includes a focus lens unit that moves during focusing, and
the focus lens unit consists of a positive lens and a negative lens.

9. The zoom lens according to claim 1, wherein the rear lens group consists of, in order from the object side to the image side, a fourth lens unit having a negative refractive power and a fifth lens unit having a positive refractive power.

10. The zoom lens according to claim 1, wherein the rear lens group consists of, in order from the object side to the image side, a fourth lens unit having a positive refractive power, a fifth lens unit having a negative refractive power, and a sixth lens unit having a positive refractive power.

11. The zoom lens according to claim 1, wherein the rear lens group consists of, in order from the object side to the image side, a fourth lens unit having a negative refractive power, a fifth lens unit having a positive refractive power, and a sixth lens unit having a positive refractive power.

12. The zoom lens according to claim 1, wherein the first lens unit consists of, in order from the object side to the image side, a negative lens, a positive lens, and a positive lens.

13. The zoom lens according to claim 1, wherein the first lens unit consists of, in order from the object side to the image side, a negative lens, a positive lens, a positive lens, and a positive lens.

14. The zoom lens according to claim 1, wherein the second lens unit consists of, in order from the object side to the image side, a negative lens, a negative lens, and a positive lens.

15. The zoom lens according to claim 1, wherein the third lens unit consists of, in order from the object side to the image side, a positive lens, a negative lens, and a positive lens.

16. The zoom lens according to claim 1, wherein the third lens unit consists of, in order from the object side to the image side, a positive lens, a positive lens, a negative lens, and a positive lens.

17. The zoom lens according to claim 1, wherein the zoom lens forms an image on a solid-state image pickup element.

18. An image pickup apparatus, comprising:
a zoom lens; and
a solid-state image pickup element configured to receive an image formed by the zoom lens,
the zoom lens comprising, in order from an object side to an image side, a first lens unit having a positive refractive power, a second lens unit having a negative refractive power, a third lens unit having a positive refractive power, and a rear lens group including one or more lens units,
wherein during zooming, the first lens unit, the second lens unit, and the third lens unit move, thereby changing intervals between adjacent ones of these lens units, and the following conditions are satisfied:

$$0.01 < f1/ft < 0.30$$

$$9.0 < f1/fw < 20.0$$

$$-0.40 < M2/M3 < 0.20$$

where f1 is a focal length of the first lens unit, fw is a focal length of the zoom lens at a wide angle end, ft is a focal length of the zoom lens at a telephoto end, M2 is an amount by which the second lens unit moves when zooming from the wide angle end to the telephoto end, and M3 is an amount by which the third lens unit moves when zooming from the wide angle end to the telephoto end.

* * * * *